(12) United States Patent
Haines

(10) Patent No.: US 6,612,516 B1
(45) Date of Patent: Sep. 2, 2003

(54) METHOD AND APPARATUS FOR CABLE DISPENSING AND PLACEMENT

(75) Inventor: Roger C. Haines, Branson, MO (US)

(73) Assignee: H. Norman Clarkson, Kirksville, MO (US)

( * ) Notice: Subject to any disclaimer, the term of this patent is extended or adjusted under 35 U.S.C. 154(b) by 0 days.

(21) Appl. No.: 09/797,192

(22) Filed: Mar. 1, 2001

Related U.S. Application Data

(63) Continuation of application No. 09/076,600, filed on May 11, 1998, now abandoned, which is a continuation-in-part of application No. 08/668,338, filed on Jun. 25, 1996, now Pat. No. 6,109,561, and a continuation-in-part of application No. 08/380,652, filed on Jan. 30, 1995, now Pat. No. 5,595,355, which is a continuation of application No. 07/642,109, filed on Jan. 16, 1991, now Pat. No. 5,421,501.

(60) Provisional application No. 60/001,182, filed on Jul. 14, 1995.

(51) Int. Cl.[7] ............................................. B65H 27/00
(52) U.S. Cl. ..................... 242/397.1; 242/397.3; 242/403; 242/404; 254/134.3 R; 254/326
(58) Field of Search ............................. 242/403, 404.2, 242/404.3, 397.1, 397.2, 397.3, 397.4, 399.1, 404, 470, 557; 254/134.3 R, 134.3 FT, 326, 335, 336, 134.3 SC; 172/272

(56) References Cited

U.S. PATENT DOCUMENTS

| | | | | |
|---|---|---|---|---|
| 3,788,575 A | * | 1/1974 | Boettcher et al. ............ | 242/403 |
| 4,136,792 A | * | 1/1979 | Wilson ......................... | 172/272 |
| 4,148,445 A | * | 4/1979 | Reynolds et al. ............ | 242/403 |
| 4,372,535 A | * | 2/1983 | Gibson et al. ........ | 254/134.3 R |
| 4,447,013 A | * | 5/1984 | Sandered et al. ............ | 242/403 |
| 4,509,768 A | * | 4/1985 | Haug .......................... | 172/274 |
| 4,587,383 A | * | 5/1986 | Stoldt ...................... | 242/397.1 |
| 4,664,331 A | * | 5/1987 | Halbrook ................... | 242/403 |
| 4,692,063 A | * | 9/1987 | Conti ................. | 254/134.3 R |
| 4,842,207 A | * | 6/1989 | Kinnan ...................... | 242/403 |
| 4,986,722 A | * | 1/1991 | Kaczmarczyk et al. ..... | 172/272 |
| 5,330,122 A | * | 7/1994 | Wood ...................... | 242/397.3 |
| 5,516,080 A | * | 5/1996 | McVaugh ........... | 254/134.3 FT |
| 5,653,293 A | * | 8/1997 | Ellis .......................... | 242/403 |
| 5,836,536 A | * | 11/1998 | Bodden ................... | 242/404.2 |

* cited by examiner

Primary Examiner—John M. Jillions
(74) Attorney, Agent, or Firm—Jonathan A. Bay

(57) ABSTRACT

An apparatus and method for forming wire bundles from a plurality of wire or cable is provided. A plurality of wires are withdrawn from a rack configured to easily receive and retain a wire spool axial. A driven pulling spool, preferably configured for quick-release coupling to a front loader or other vehicle, is used to pull a cable or bundle along a desired path. Pulling is facilitated by rollers, preferably configured to reduce pulling tension, intermediate endless track tuggers and/or sheaves configured to facilitate coupling to trays or scaffolding. Jacks are described for positioning or holding cables. Preferably rollers or sheaves may be positioned to guide cables along a path above the cable tray or other ultimate position.

10 Claims, 16 Drawing Sheets

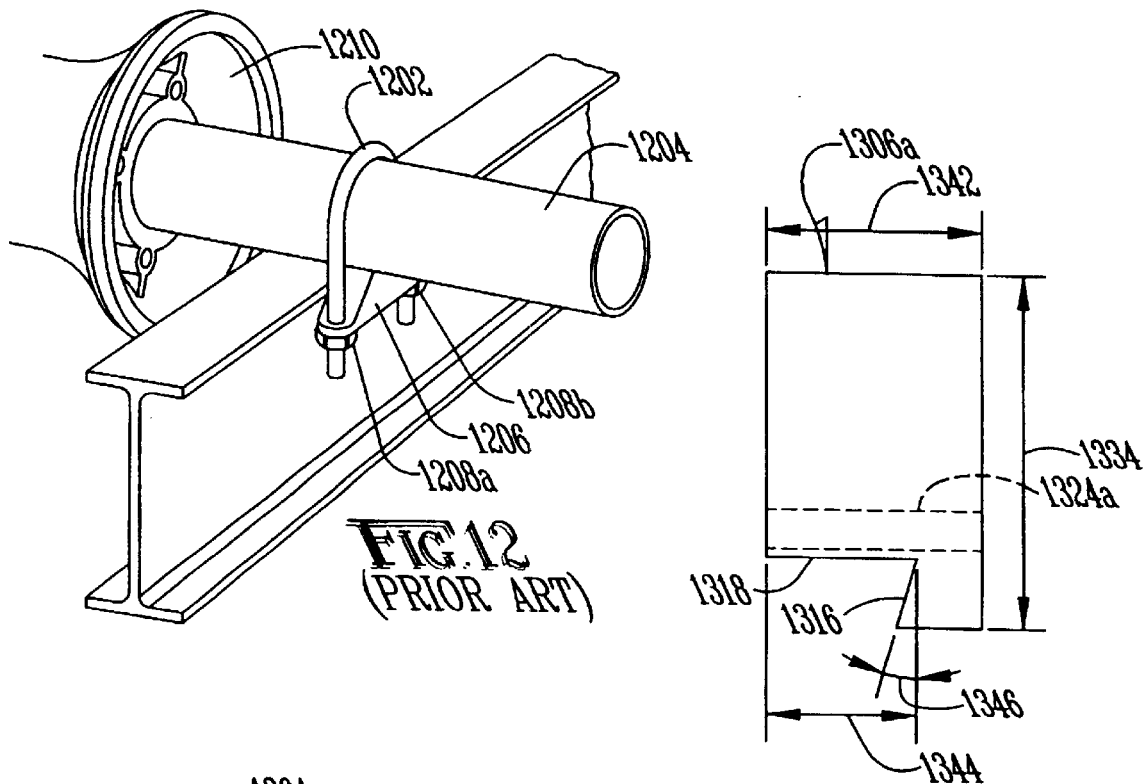
FIG. 12 (PRIOR ART)
FIG. 14
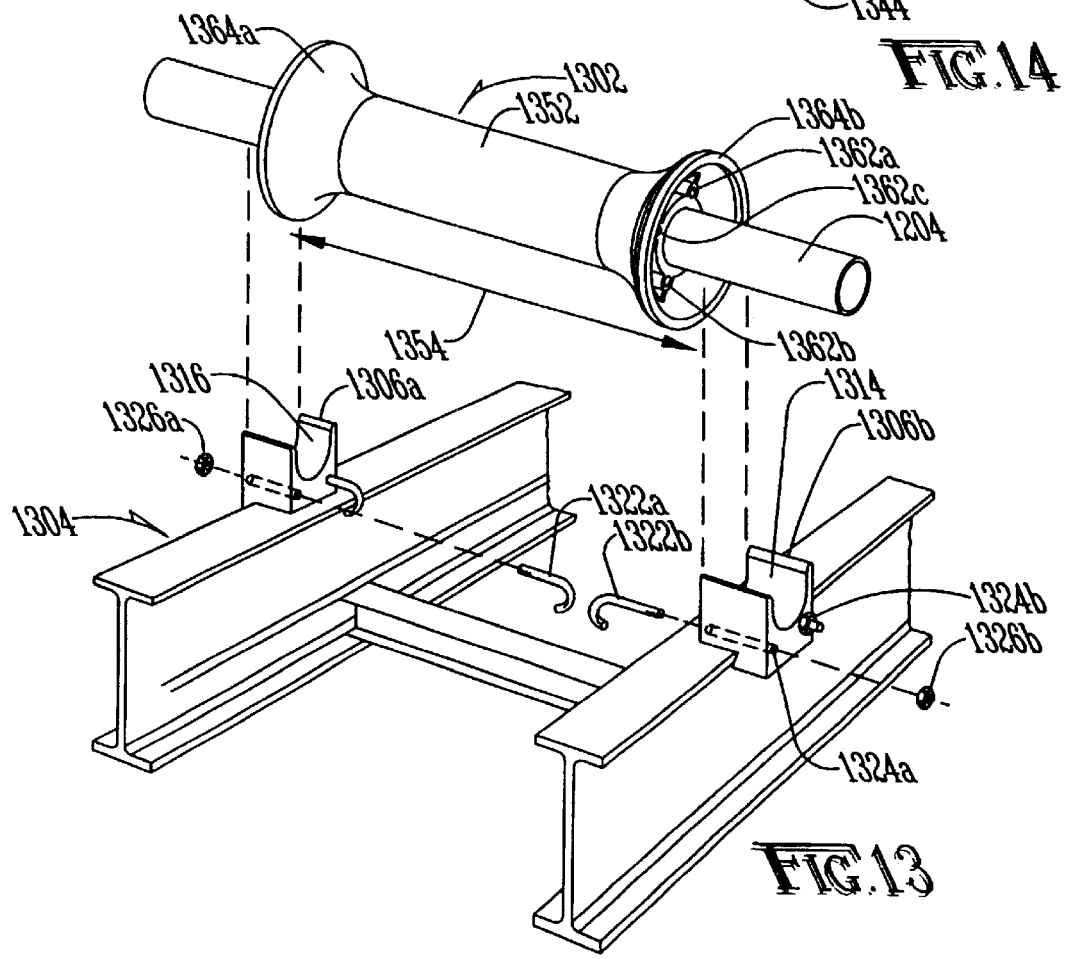
FIG. 13

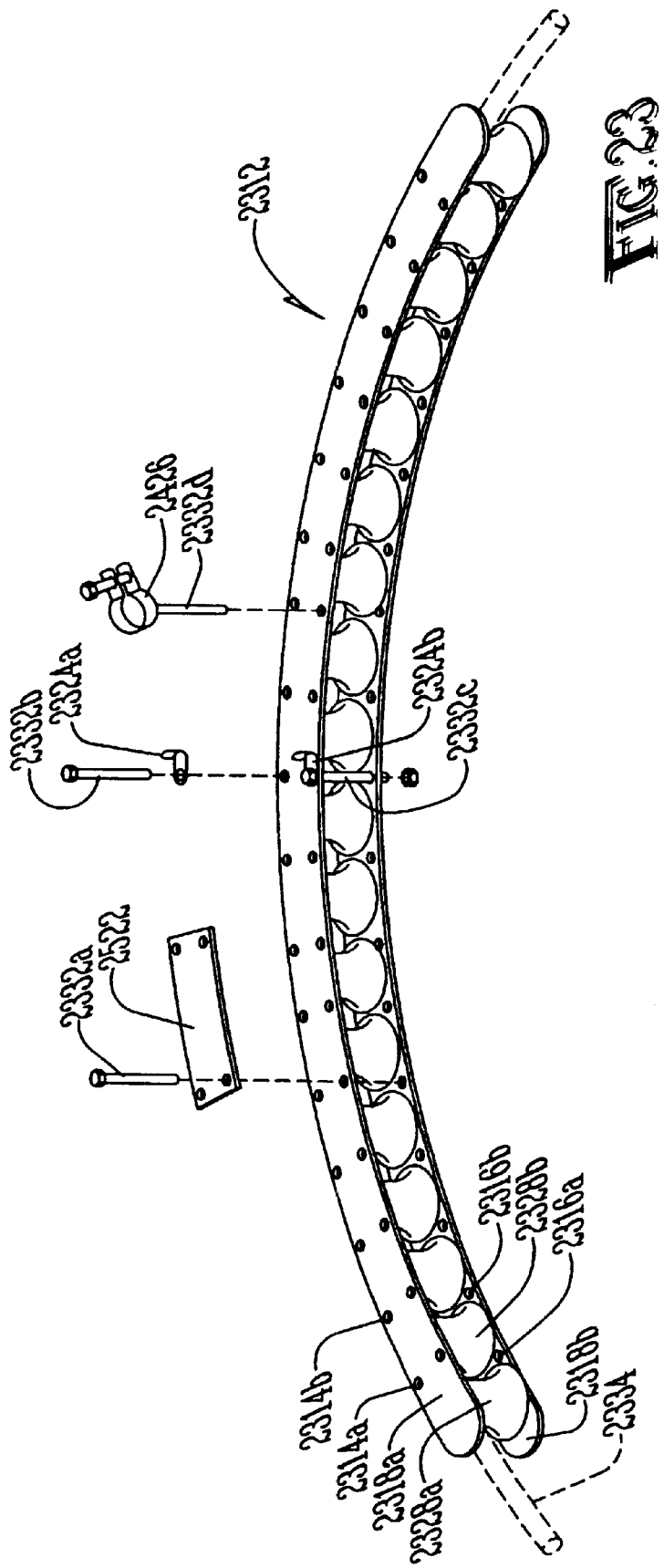

METHOD AND APPARATUS FOR CABLE DISPENSING AND PLACEMENT

This application is a continuation of U.S. patent application Ser. No. 09/076,600, filed May 11, 1998 now abandoned; which is a continuation-in-part of U.S. patent application Ser. No. 08/668,338, filed Jun. 25, 1996, U.S. Pat. No. 6,109,561; which claims the benefit of U.S. Provisional Application No. 60/001,182, filed Jul. 14, 1995 and which is also a continuation-in-part of U.S. patent application Ser. No. 08/380,652, filed Jan. 30, 1995, U.S. Pat. No. 5,595,355; which is a continuation of U.S. patent application Ser. No. 07/642,109, filed Jan. 16, 1991, U.S. Pat. No. 5,421,501.

BACKGROUND INFORMATION

The present invention relates to a method and apparatus for dispensing and/or positioning strands of wire or cable or other items and in particular to dispensing wire or cable, e.g., for forming a bundle and placement of the bundle.

In the construction industry, it is commonly necessary to position a plurality of wires, cables, or the like along similar paths. Typically, the plurality of wires or cables are formed into a bundle and the bundle is put into position such as by pulling it along a desired path.

Often, a wire cable or bundle path is defined at least partially by a conduit, often an underground or inter-wall conduit, and/or a cable tray. Typically a cable tray has a floor region defined by, e.g., a plurality of beams, ties, plates, etc., and has a depth defined by sidewalls or side members which may be, for example, plates, I-beams, channels and the like. Pulling cables, wires or bundles along conduits or cable trays or other paths often involves a relatively high degree of tension during the pulling process, particularly when the cables are large or heavy. Furthermore, in many situations the tension required for cable pulling may be variable, involving sudden increases or spikes in the pulling tension, sometimes accompanied by sudden decreases. Variability in pulling tension can have serious safety consequences, e.g. if cables, ropes or the like unexpectedly part, and requires a greater pulling force to achieve the desired placement than if such tension spikes could be avoided. Without wishing to be bound by any theory, it is believed that the average tension, and spikes in the pulling tension involved in cable pulling, can be at least partially attributed to factors such as friction between cable and stationary surfaces (including cable tray surfaces, conduit surfaces and surfaces of adjacent cables), and/or flexing of cable, as cable is moved along a non-linear path (either because the desired path is non-linear or because the cable itself has a tendency to kink or revert to a previous cable shape, i.e., has a shape "memory").

Accordingly, it would be advantageous to provide a cable pulling system or components thereof which assist in reducing or eliminating spikes in pulling tension and in reducing overall or average tension, such as by avoiding friction or accommodating cable memory. It is believed that it would be particularly advantageous to provide such a system or components which can be relatively easily and inexpensively provided, installed, manipulated and used.

Because wires and cables of the type currently installed come in a wide variety of shapes, sizes, weights and configurations, it would be advantageous to provide a cable system and components which can readily accommodate or be modified to accommodate a wide variety of cable or bundle configurations.

The process of forming and positioning a bundle is particularly difficult when the individual wires or cables in the bundle must have different starting and/or ending points. FIG. 1A illustrates schematically a bundle, consisting of three wires 10, 12, 14 which are, following positioning, intended to extend between beginning and ending terminals 10a, 10b, 12a, 12b, 14a, 14b, respectively. Because, in the example shown, the beginning and ending terminals 10a, 10b, 12a, 12b, 14a, 14b do not coincide for any of the wires 10, 12, 14, the bundle which is to be pulled along the desired pathway is preferably formed as shown in FIG. 1B. Of particular note is that none of the starting or ending points of the three wires 10, 12, 14 occur at the same point along the bundle 16.

According to previous methods, a bundle such as the bundle 16 shown on FIG. 1B would be formed by extracting each length of wire 10, 12, 14, separately. Typically, the wires 10, 12, 14 would each be pulled from a wire spool, measured, such as with a tape measure, and laid on the surface such as the ground or a floor surface. Next, the three wires 10, 12, 14 would be moved lengthwise, relative to each other, until they had the configuration shown in FIG. 1B. At this point, the wires 10, 12, 14 could optionally be permanently or temporarily held together such as by using cable ties or the like. The bundle 16 thus formed would then be in a configuration such that it could be pulled along the desired pathway.

Once the bundle 16 is formed, it is moved to the initial point of the pathway along which it is to be pulled. Typically, it is moved by pulling or carrying the bundle. Next, the bundle is placed along the desired pathway. According to one method a rope is first placed along the desired pathway, one end of the rope is attached to one end of the bundle and the rope is pulled from the other end, thus pulling the bundle along the desired path. In previous devices, cable was sometimes pulled along a path using a motor. Such motors typically have one or a few rates of pull, making it impossible to accurately adjust the rate of pull to the conditions. Typically, the motor was attached to a portion of a relatively massive object, such as a portion of a building, a beam, or a wall. This placed undesirable constraints on where the motor can be positioned so that pulling efficiency was reduced. Pulling efficiency is typically greatest when the pulling apparatus is positioned near one end of the pathway, end of a conduit or cable tray and the like. Because of the need to attach the motor to, e.g., the building, a large amount of time was required to set up the motor to achieve a pull.

The process of pulling each individual wire, measuring each individual wire, and moving the wires until they have the desired configuration relative to each other is labor-intensive and thus expensive. Furthermore, even when starting or ending points coincide, the process is prone to error, particularly when a large number of wires, such as different gauge wires, are used to form the bundle. Additionally, once the bundle is formed, transporting the bundle to the entry point of the pathway along which it is to be pulled is cumbersome.

In some instances, it has been found useful to position one or more rollers along the desired pathway in order to help guide the bundle as it is being moved. In some cases, it is convenient to form a roller from a length of pipe such as PVC pipe 18 (FIG. 2). In order to provide for axial mounting of the pipe 18, endcaps 20 are press-fitted into the ends of the pipe 18. The endcaps 20 may have hubs 22 for axially mounting the rollers thus formed. The rollers formed according to the configuration shown on FIG. 2, however, have been found to be susceptible to permitting the cable which it supports to slip over the end 24 of the roller, thereby often causing the cable to bind or even damaging the cable.

SUMMARY OF THE INVENTION

The present invention relates to a method and apparatus which, among other things, reduces the time and effort necessary to form and place bundles, compared to the previous methods used. According to one embodiment of the invention, a clip is provided for holding a roller adjacent, preferably substantially above, a cable tray with provision for quickly releasing the roller from the clip, e.g. for re-positioning the cable from a position above the roller to a position below the roller, such as in or on a cable tray. Preferably the roller may readily move laterally across the width of the cable tray, e.g. to accommodate irregularity or shape memory of a cable and thus reduce or avoid tension spikes.

In one embodiment, a pair of endless tracks can be used to provide for intermediate cable tugging or pulling. When a central beam forms a part of the cable tray, rollers may be positioned using a device for attaching to the central beam such as a roller-holder with resilient or otherwise movable beam-grasping arms. When cable placement makes it desirable to, e.g. laterally position or hold a cable, a cable jack may be used, preferably fitted with plates or similar components for contacting and moving cable 5 while avoiding damage to the cable. In one embodiment a plurality of rollers or sheaves are positioned on a curved or radiused holder for supporting or guiding cables along a nonlinear path. Preferably such radiused sheave device is provided with couplers for quickly and easily positioning and holding the radiused sheave device in the desired location.

According to one embodiment of the present invention, two or more sources of wire are provided on a rack. As used herein "wire" refers to any filamentous material, preferably electrical wire or electrical cable, but including also material such as plastic or other non-electrical wire or cable, rope, chain, optic fibers, and the like. One or more of the wires is connected to a counter.

In one embodiment, a rack includes a platform portion and one or more pairs of upstanding arms configured to receive one or more cable axes reel axials so as to facilitate reel rotation while avoiding undesirable axial displacement and preferably so as to facilitate the process of loading or unloading reels with respect to the rack.

A cable bundle is transported near one end of the desired pathway for the bundle. This can be done by transporting the holding spool to such location or by transferring the bundle to a secondary spool which is then moved near one end of the desired pathway. It is also possible to pull the bundle as it is being measured and formed directly into the desired pathway without first storing it on the holding or secondary spool.

Preferably, a rope connected to a drive able pulling spool has been positioned along the desired pathway and connected to one end of the bundle. Upon driving the drive able pulling spool, the rope is wound onto the pulling spool and the bundle is pulled along the pathway formerly occupied by the rope thus positioning the bundle as desired.

BRIEF DESCRIPTION OF THE DRAWINGS

FIG. 12 depicts connection of a roller axle to a cable try according to previous devices;

FIG. 13 is a partial perspective view depicting a clip for connecting a roller to a cable tray according to an embodiment of the present invention;

FIG. 14 is a side elevational view depicting a clip for connecting a roller to a cable tray according to an embodiment of the present invention;

FIG. 23 is a perspective view of a radiused sheave device depicting various couplers thereof according to embodiments of the present invention;

DETAILED DESCRIPTION OF THE PREFERRED EMBODIMENT

Figure 3:
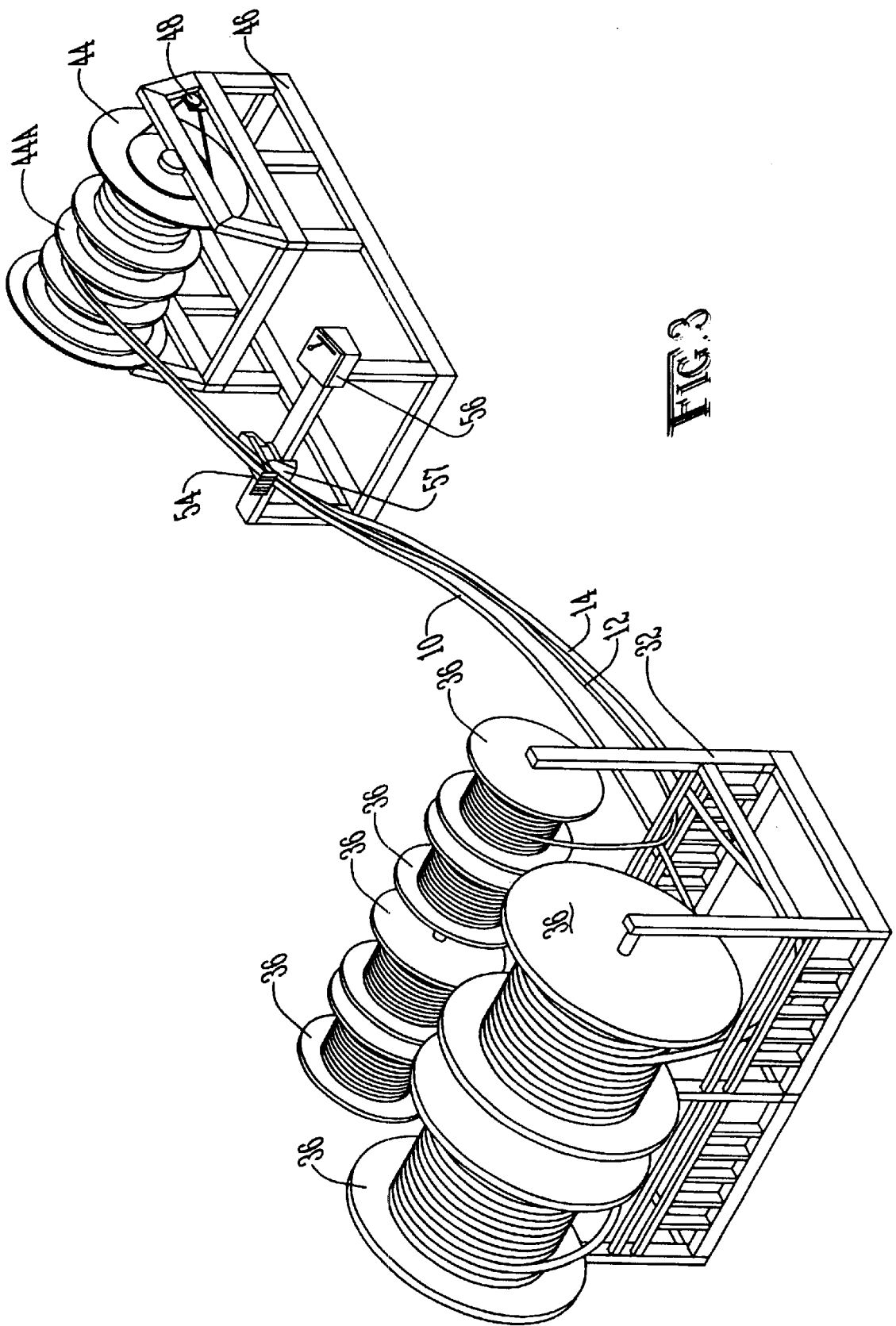
FIG. 3 is a perspective view of a portion of a rack with wires therefrom connected to a holding spool.

As depicted in FIG. 3, a reel rack 32 includes a plurality of upright members 34 for supporting a plurality of wire or cable reels 36. Preferably the rack 34 is configured to accommodate a range of reel sizes, such as spools up to 72,000 pounds, 12 feet diameter, 8 feet wide. The reels are rotatably mounted so that the reel contents can be withdrawn from all of the reels generally in a first direction, such as that indicated by arrow 38. In one embodiment, a lattice 42 is provided so that wires or cables withdrawn from the reels 36 can be guided by inserting through openings in the lattice 42. According to one embodiment of the invention, the supply spools 36 can be drivable, such as by providing an electric motor for one or more of the supply spools.

Figure 17:
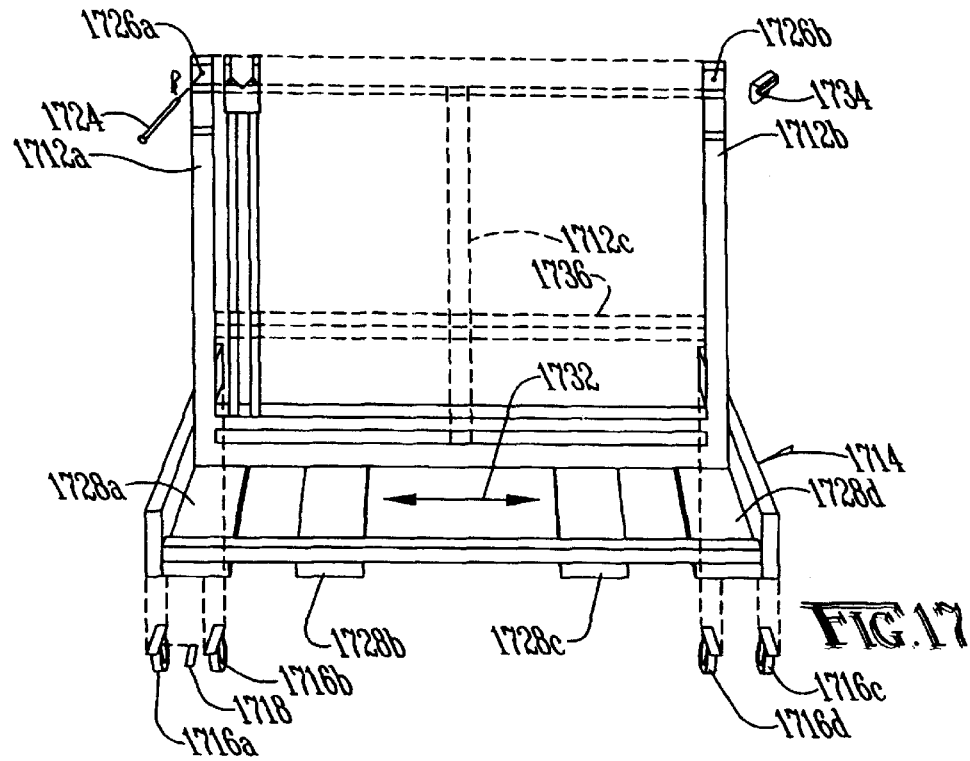
FIG. 17 is a perspective view of a cable reel rack according to one embodiment of the present invention.
Figure 18:
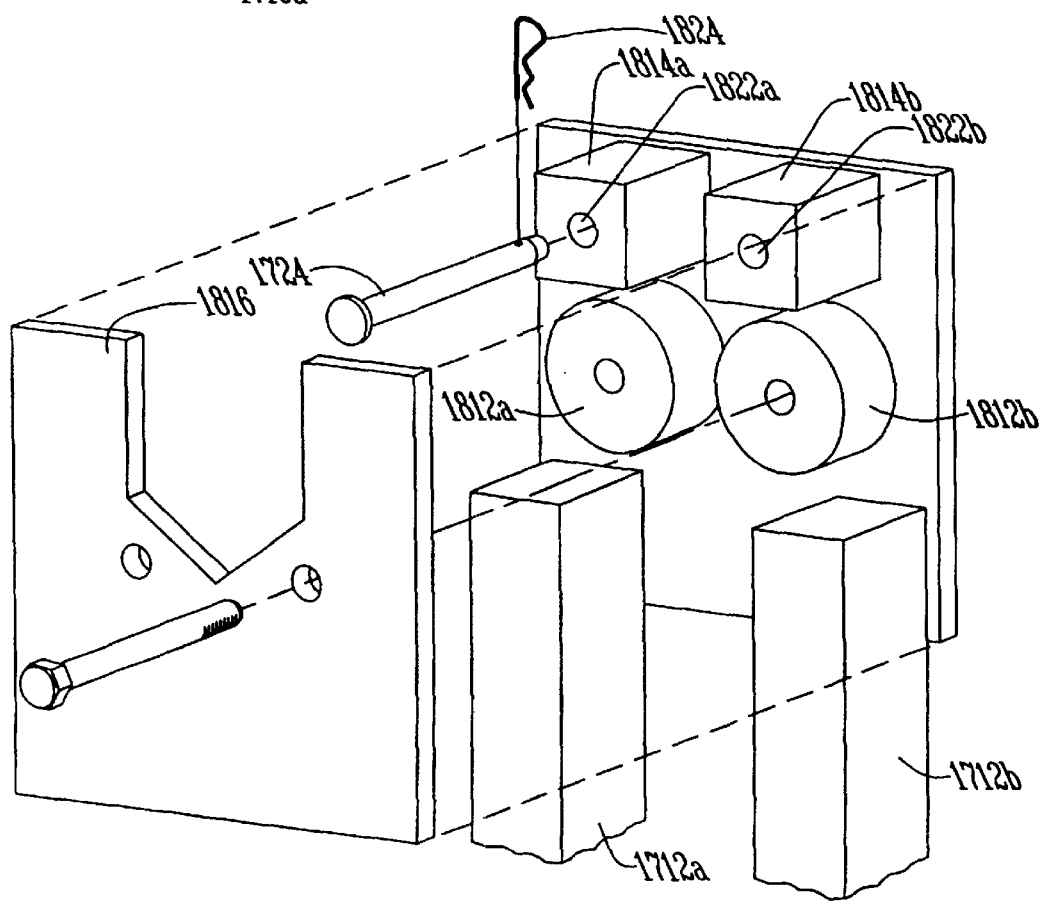
FIG. 18 is a partially exploded perspective view of a reel axial receiving portion of a reel rack according to an embodiment of the present invention.

FIGS. 17 and 18 depict another rack configuration. In the embodiment of FIG. 17, uprights 1712a, 1712b are welded or otherwise coupled to a base platform 1714. If desired, one or more intermediate uprights 1712c can be provided e.g. to accommodate more and/or smaller reels. The platform 1714 may be configured to rest directly on the ground or other support surface or may be fitted with wheels or casters 1715a,b,c,d, e.g. for wagon-style movement. If desired, the platform 1714 can be provided with two wheels 1716a, 1716c (with or without stands or stops at other portions of the platform), e.g. for trailer-style movement. If desired, wheels or casters may be provided with friction or other wheel locking or braking levers 1718 or other stopping mechanisms. The uprights 1712 are configured to receive shafts of a cable reel preferably supported by rotatable rollers 1812a,b. The shaft 1722 is lowered into position, preferably guided by fixed or pivotable plates or retainer collars 1814a, 1814b and/or by the configuration of a front plate cut-out 1816. Once the shaft 1722 is in position, it may be restrained against vertical movement by inserting a locking pin 1724 through holes in the uprights 1726a,b and/or retaining collars 1822a,b, with the pin 1724 being secured, e.g., with a key 1824. The rack of FIG. 17 may, if desired, be moved using a forklift with the forks accommodated in pockets 1728a,b,c,d. If desired, one or more of the pockets may be configured for adjustment 1732 of lateral spacing such as by mounting pockets on a sliding track or providing a plurality of bolt openings for attaching pockets at desired locations. The rack of FIG. 17 may be provided with an upper bracket 1734, e.g. to accommodate lifting with a crane.

Preferably the rack 17 may be sized or modified to accommodate a wide variety of reel sizes such as by accommodating reels of up to 72,000 pounds (33,000 kilograms) or more, or by a accommodating a plurality, such as up to 64 reels of, e.g., 6-ft. (2 m) diameter or up to 128 reels of 30-inch (0.75 m) diameter. The racks 17 can be configured to include cable guides such as the lattice cable guides depicted in FIG. 3. In one embodiment, the rack may include 30 or more guides on each side for a total of 60 guides. The rack 17 may be configured with a lower roller 1736 or rollers to assist in guiding cable off the reels. Friction or other locks or brakes may be provided to control rotational movement of the reels.

To accommodate a large number of cable reels, two or more racks may be coupled such as by-being bolted together, e.g. in a longitudinal and/or lateral arrangement or array, and racks may, if desired, be used in multiple banks.

Figure 7:
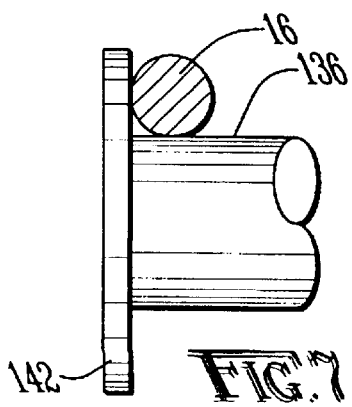
FIG. 7 is a schematic depiction of a roller and a portion of a cable which is not smoothly fluted.

A holding reel 44 is mounted on a stand 46 to permit rotation of the holding reel 44. In one embodiment, the holding reel 44 is connected to a motor 48 by a chain or belt 52 to permit the holding reel 44 to be driven. The holding reel 44 may be configured with a plurality of partitions 44a, as seen in FIG. 7, so that the holding reel 44 can be used to form a plurality of bundles. Preferably, the holding reel 44 is transportable, such as by a front-loader 94.

Adjacent the holding reel 44 is a linear counter 54. The linear counter 54 may be any of a number of linear counters known in the art. One example of a linear counter that can be used is Model 1704, available from Reel-O-Matic. The linear counter 54 receives a length of wire, cable, or other filamentous material. As the wire or cable is drawn through the counter 54, the counter 54 provides an indication of the length of wire which has passed through the counter 54.

In one embodiment, a device is provided to guide wire or cable onto the holding reel 44 so that it is coiled onto the holding reel 44 in an ordered helical fashion. The device for guiding the wire or cable onto the holding reel 44 can be part of or attached to the linear counter 54 by slidably or movably mounting the counter 54 onto a beam 56 so that by driving or moving the counter 54 along the beam 56, such as with an electric motor 57, the cable is guided onto the reel 44 as desired. Rather than using the counter 54 to guide the wire or cable, a separate yoke can also be used to guide wire onto the holding reel 44.

Additional counters similar to counter 54 can be provided, such as by providing a counter for each of the reels 36 on the rack 32. Additional counters can be used, for example, to indicate the amount of cable remaining on the reels 36. In this way, it is possible to determine whether sufficient wire remains on the reels 36 before composition of a new bundle is undertaken. This is particularly important in the present invention since the bundle is developed as wire is being withdrawn from the reels, so that if insufficient wire or cable is on one of the reels 36, the bundle being formed would normally have to be re-formed from the beginning.

After the bundle or cable is formed on the holding reel 44, it is preferably transported to a location near the site where it will be installed. This can be achieved either by making the reel 44 movable to the site or by spooling the bundle from the holding cable 44 to a secondary spool 45, depicted in FIG. 4. The secondary spool 45 is supported on a stand 47. The secondary spool 45 is preferably free to rotate on the stand 47, but may be configured to permit the reel 45 to be driven. Preferably, the stand 47 is configured for easy attachment to a transportation device, such as a front-loader or other type of tractor 94.

Figure 1A:
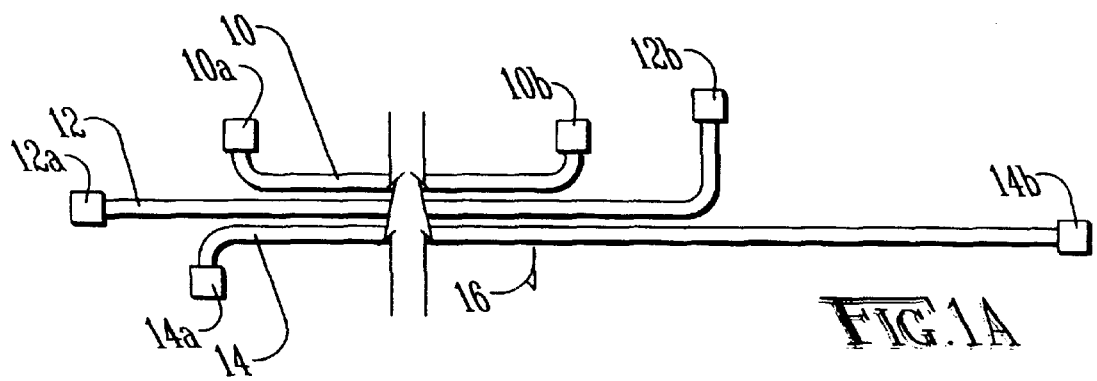
FIGS. 1A and 1B are schematic diagrams of a bundle in position and a bundle before positioning.
Figure 1B:
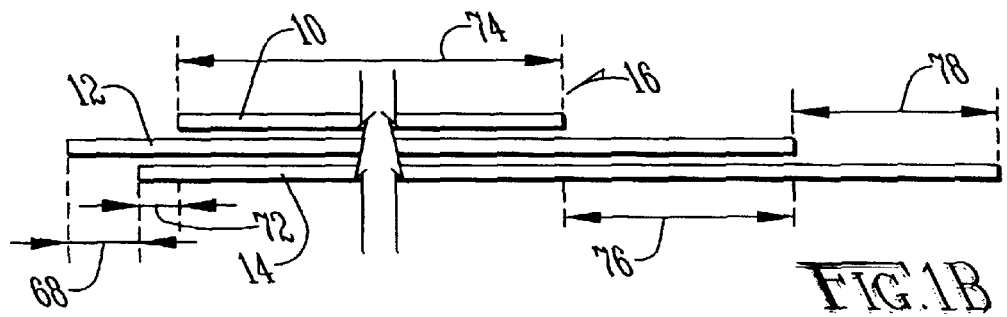
Figure 2:
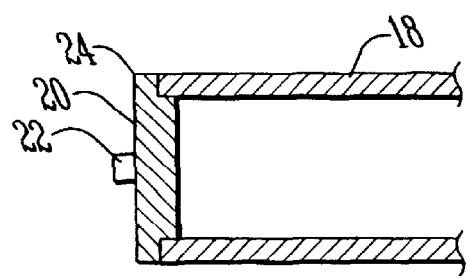
FIG. 2 is a schematic cross-section of a portion of a roller according to previously used devices.

As depicted in FIG. 3, in operation, strands of wire or cable 10, 12, 14 are withdrawn from the reels 36 for formation of a bundle. In the following discussion, the bundle formation will be described for a bundle configured as shown in FIG. 1A. The procedure for configuring other bundles will be apparent to those skilled in the art. The first wire 12 is removed from the desired reel 36 and inserted into the linear counter 54. A desired length 68 of the first wire 12 is pulled through the counter 54 and wound onto the holding reel 44. The first wire 12 is wound onto the reel 44, such as by driving the reel 44 using the motor 48. The second wire 14 is then withdrawn from a second reel 36, and a second length 72 of both the first wire 12 and the second wire 14 is simultaneously wound onto the holding reel 44. Although the counter 54 is directly measuring only the first cable 12 at this point, it is capable of also measuring the length of the second wire 14 as it is pulled from the rack, since the first and second wires 12, 14 are being wound onto the holding reel 44 at the same rate. Thus, the length of the first wire 12 which is measured is also the length of the second wire 14 which is being withdrawn. The third wire 10 is then withdrawn from a third reel 36 and positioned next to the first two wire 12, 14 in the vicinity of the counter 54. A third length 74 of the three wire 12, 14, 10 is then wound onto the holding reel 44. The third wire 10 is then severed in the vicinity of the counter 54. A fourth length 76 of the first and second wire 12, 14 is then wound onto the holding reel 44. The first wire 12 is then severed in the vicinity of the counter 54. Since wire 12 is the wire which is being measured by the counter 54, in order to continue, it will be necessary to insert the second wire 14 into the counter 54. A fifth length 78 of the second wire 14 is then wound onto the holding reel 44 and the second wire 14 is then severed in the vicinity of the counter 54. At this point, a bundle of the configuration depicted in FIG. 1B has been formed and wound onto the holding reel 44. The bundle 16 is wound onto the holding reel 14 such that one of the ends of the bundle is free to permit access to that end of the bundle. The procedure has included simultaneously withdrawing a plurality of wires of predetermined lengths.

According to one embodiment, the apparatus shown in FIG. 3 can be used to form additional bundles on to holding reel 44, for example, on other segments of the reel 44. Bundles which have been formed on the reel 44 are preferably transported to a location near one end of the region where the bundle is to be positioned. According to one embodiment, a secondary reel 45 is positioned adjacent the holding reel 44, (e.g. using a front-loader 94) the outermost end of one of the bundles on the reel 44 is attached to the spool of the reel 45, and reel 45 is rotated to draw the bundle onto the secondary reel 45. The secondary reel 45 is then transported to the desired location, such as by using a front-loader tractor or similar device 94. According to another embodiment, the holding reel 44 is located adjacent one end of the pathway along which the bundle is to be positioned.

Figure 4:
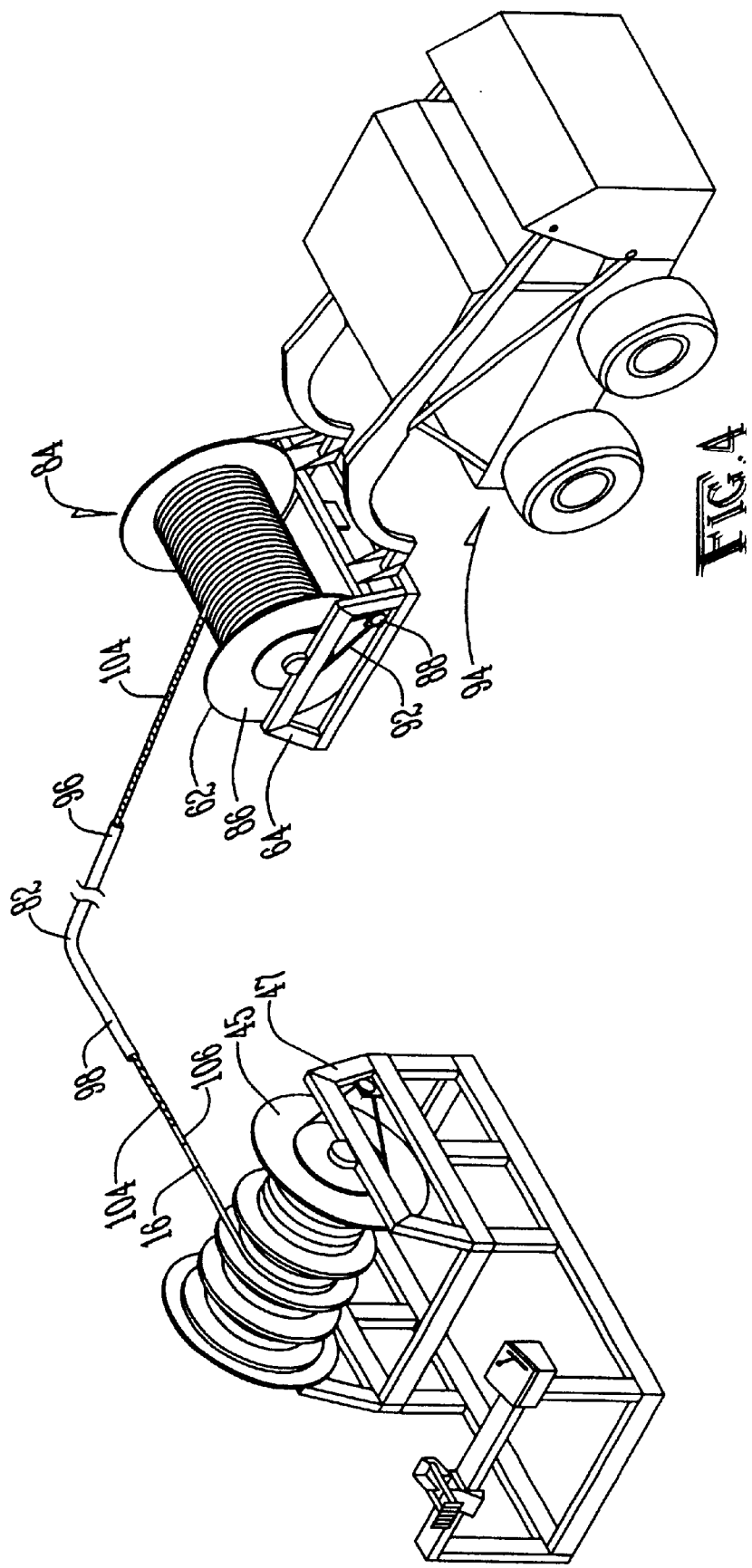
FIG. 4 is a partial schematic perspective view of a pulling spool having a rope connected to a cable on a holding spool.
Figure 19:
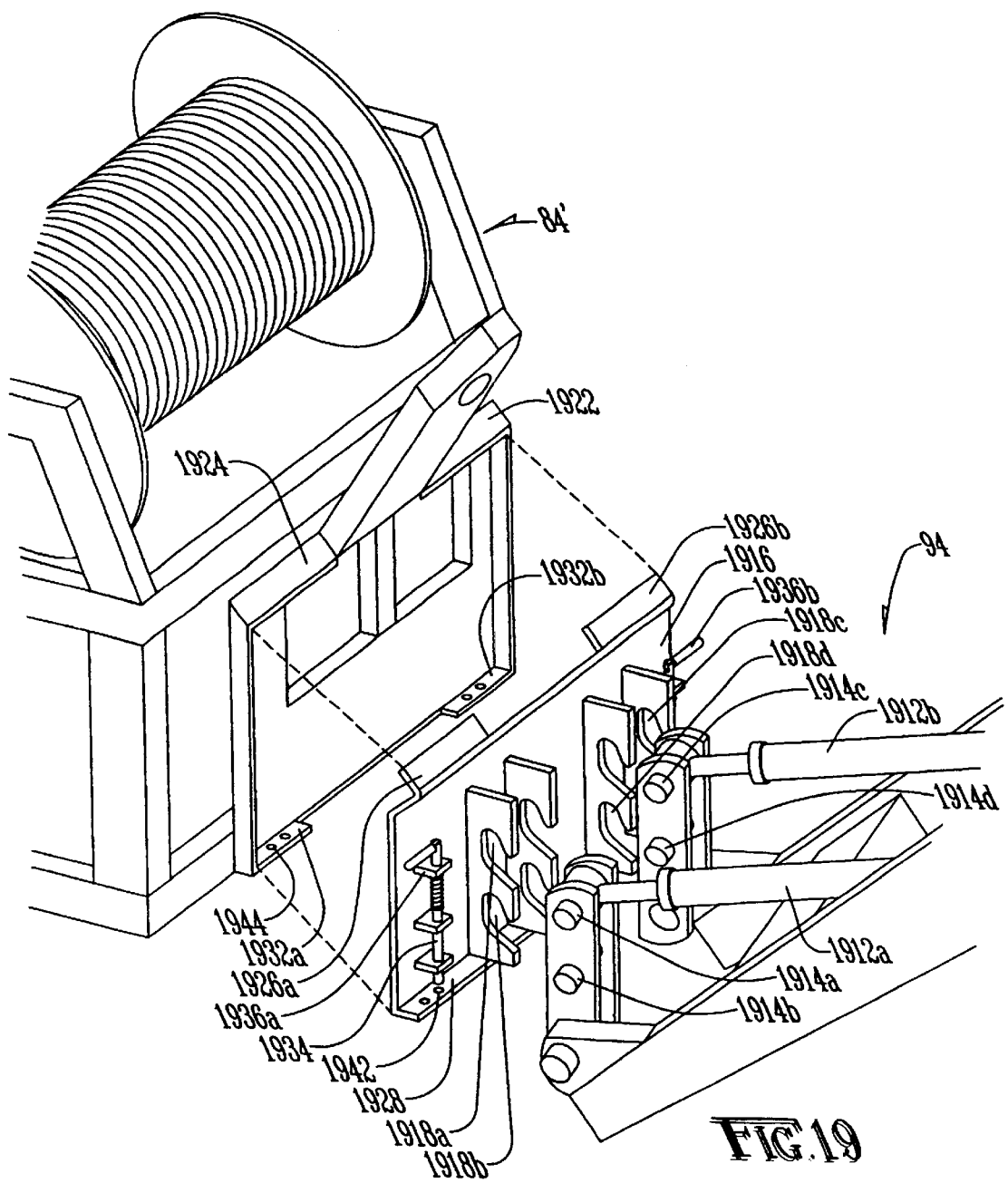
FIG. 19 is a perspective view of a mechanism usable in connection with coupling a cable puller device to a front loader.

FIG. 4 depicts an embodiment which the bundle 16 is to be positioned through conduit 82. As will be apparent to those skilled in the art, the method and apparatus described herein can also be used to position bundles, cable, or wire along wire troughs, wire trays, cable trays and wire ways. As depicted in FIG. 4, a tugger 84 is provided, which includes a pulling reel 86 connected to a motor 88 by a cable or belt 92. Preferably, the tugger 84 is driven by a hydraulic system capable of pulling about 9,000 pounds (about 4000 Kg), preferably up to 18,000 pounds (about 8000 Kg) or more. Alternatively, the reel 86 may be driven by an electric motor. Preferably, the pulling speed is variable, such as to provide pulling reel revolutions per minute from 0 to about 70. The tugger can be provided with a guide device, such as a yoke (or winder), to guide the rope onto the spool, preferably by moving side-to-side to place the rope on the drum evenly. For example in one embodiment a multiple speed transmission permits adjustment between high speed pulling, e.g. for use with reeling rope, and low speed Preferably, the tugger 84 is configured for attachment to a front-loader 94, tractor, extendable or non-extendable forklift, or similar device. In this way, the tugger 84 can be located near the end 96 of the pathway or conduit 82 opposite the end 98 where the bundle 16 is initially located. Although it is possible to use a forklift-type coupling to the tugger as depicted in FIG. 4, in one embodiment the tugger is configured to accommodate a quick connect coupling such as that depicted in FIG. 19. In FIG. 19, the hydraulic lift arms 1912a, 1912b of a front loader 94 are coupled to posts 1914a,b,c,d. An intermediate plate 1916 includes couplers defining hook-shaped recesses 1918a,b,c,d for receiving and engaging the posts 1914a,b,c,d. The tugger stand 84' is configured with a generally planar socket 1922 for receiving and engaging the plate 1916. In the depicted embodiment, the socket 1922 includes a downwardly angled upper lip 1924 for engaging a (preferably similarly angled) plate upper edge 1926a,b. In practice, an intermediate plate 1916 will be coupled to a front loader using coupler recesses 1918 and the thus-equipped front loader can rapidly and readily engage any of a number of different tugger stands which are equipped with sockets 1922.

The front loader 94 will be controlled to bring the plate 1916 towards the socket with the upper edge 1926a,b angled downward to fit under the socket lip 1924 and then the lower ledge 1928 of the plate 1916 will be moved towards the tugger 84' to rest over adjacent corresponding lower plates 1932a,b of the socket 1922. One or more latching tabs 1934 are controlled, e.g. via rotatable handles 1936a,b to extend through a hole 1942 of the intermediate plate 1916 and into a corresponding hole 1944 of the socket 1922.

When it is desired to detach the front loader from the tugger, the process is reversed, moving handles 1936a,b to withdraw the tabs 1934, retracting the lower ledge 1928 of the intermediate plate 1916 and then angling the plate 1916 to withdraw the upper edge 1926a,b of the intermediate plate 1916 from beneath the downwardly-angled upper lip 1924 of the socket 1922. In this way, tugger stands may be rapidly and securely coupled to and detached from front loaders or similar moving equipment.

In at least some previous procedures, when a pulling point (such as the end of a conduit or cable tray) was spaced distant from the desired location of the cable end, a pulling device was, previously, typically required to be positioned at the distant desired endpoint and additional tugging, e.g. through the cable tray or conduit, continued after the cable end had reached the pulling point. According to an embodiment of the present invention, in contrast, after the cable end (or a portion of a bundle) has reached the location of a tugger positioned at a pulling point, rather than repositioning the tugger, the tugger continues to operate, reeling additional cable, pulled through the conduit or cable tray, onto the tugger reel. When the required length to reach the ultimate endpoint has been pulled onto the tugger reel, the motion of the tugger reel can be reversed, in one embodiment, spooling the additional cable length off the tugger reel so that it can be led to the desired endpoint.

Figure 20:
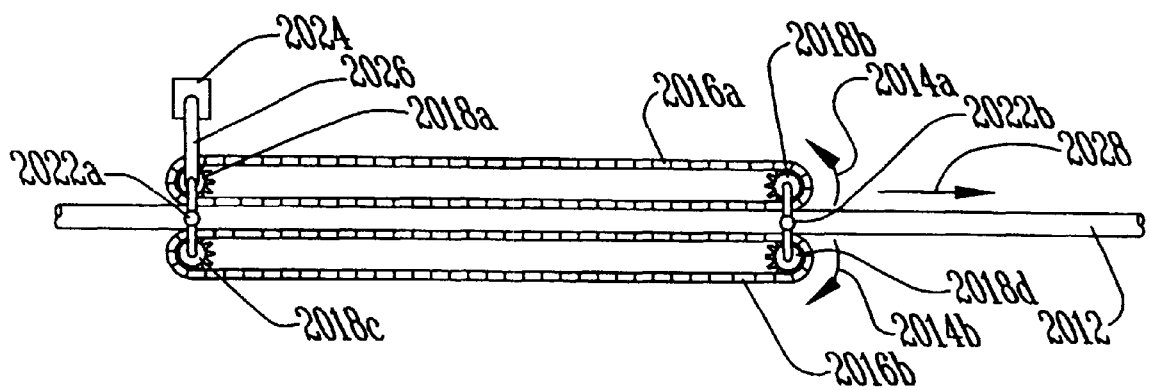
FIG. 20 is a side elevational view of an intermediate cable pulling device according to an embodiment of the present invention.

Although it would, in some circumstances, be useful to apply a pulling force or tension to a cable at locations along the path other than at the end or pulling point, it is believed that such intermediate pulling has not been previously successfully achieved, at least partially because of the risk of damaging cable by intermediate gripping or pulling devices. FIG. 20 depicts an intermediate pulling device which is believed to reduce or eliminate risk of damage to cable from intermediate pulling or gripping. In the embodiment of FIG. 20, the cable 2012 or bundle is positioned between two counter-rotating 2014a,b endless belts or tracks 2016a, 2016b. The tracks may be formed of a number of materials including metal, plastic, fabric, rubber and the like. For example, the tracks 2018a, 2016b may be adapted from or similar to those commonly used in bulldozers and similar equipment. The belts pass between spaced-apart sprockets 2108a,b,c,d, rollers or the like, which can preferably be moved toward one another, e.g. by turn buckles 2022a,b or other adjustment devices to press the tracks 2016a, 2016b against opposite surfaces of the cable 3012. At least one of the sprockets 2018a are driven e.g. by a motor 2024, directly or coupled by a belt 2026, chain or other coupler for transmission. The resulting counter-rotating motion 2014a, 2014b provides a pulling force 2028 on the cable 2012 while reducing or avoiding damage to the cable 2012. The intermediate tugger is believed to be particularly useful in connection with positioning relatively large diameter cable (e.g. 2 to 5 inches or more) where the cable has extensive or strong kinks or shape memory and/or the cable path is highly non-linear.

Preferably, the tugger 84 includes a device for determining the amount of force or pressure exerted during the pulling operation. A matter of some concern during pulling cable or bundles of cable or wire is the amount of force or pressure experienced by the cable during the pull. Excessive force or pressure can indicate damage to the cable during the pull. When motors were used for pulling cable, motor amperage was sometimes used as an indicator of pressure on the cable. However, this provides only an indirect indication and is often inaccurate. In a preferred embodiment, the device for determining force or pressure is a direct hydraulic measurement device. A gauge 102 (FIG. 14) or similar readout means may be provided for indicating force or pressure. In one embodiment the pulling tension for an entire pull may be recorded, e.g. on a recording graph or in an electronic memory or other data storage device.

Figure 11:
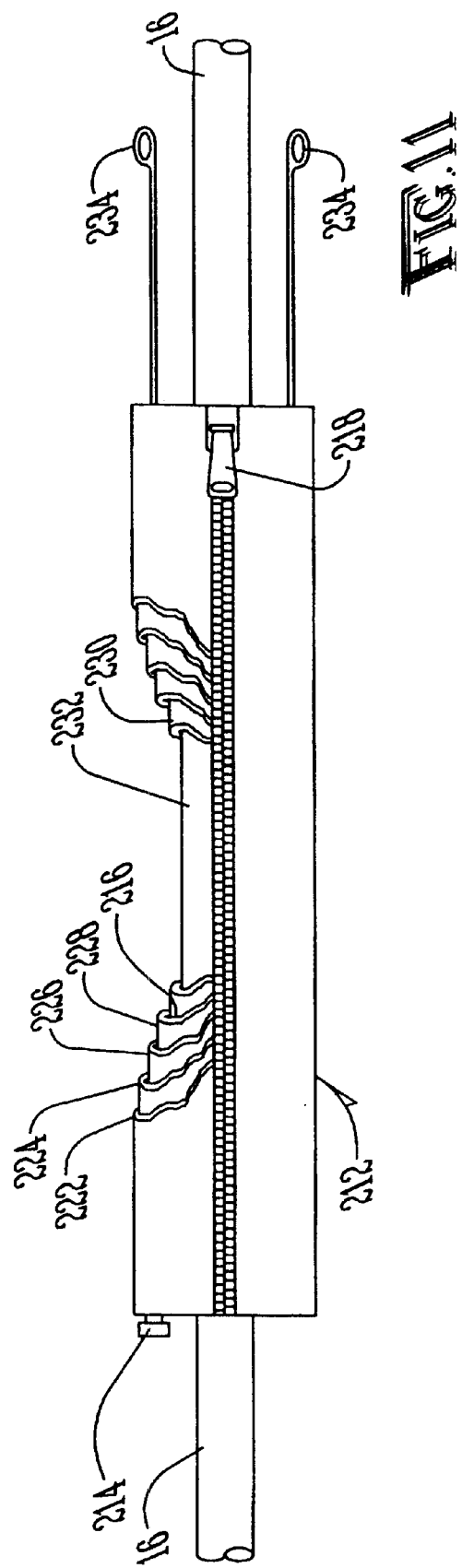
FIG. 11 depicts an inflatable sleeve for cable attachment.

A rope 104 is wound onto the pulling reel 86. A length of the rope 104 is withdrawn from the pulling reel 86 and threaded along the pathway 96, 98 where the bundle 16 is to be positioned. The end of the rope 104 is attached to the free end of the bundle 16. One method for attachment of the rope 104 to the bundle 16 is by way of a braided sheath 106. The braided sheath 106 is braided in a fashion that causes the diameter of the sheath to diminish in response to a pulling motion on one end of the sheath, in a manner similar to a so-called Chinese finger trap. However, this method of attachment has been found to sometimes cause damage to the cable. Furthermore, this method of attachment is not readily applicable for attachment to an intermediate section of cable, e.g., to guide a bundle into a blind conduit (i.e., one without an outlet). According to one embodiment of the present invention, attachment is accomplished by way of an inflatable sleeve or sheath 212 (FIG. 11). The inflatable sheath 212 is a generally cylindrical-shaped sheath having inner and outer walls with a space therebetween 216 coupled to a valve 214 to permit pressurization or inflation of the area 216 between the walls. Preferably, the inner and outer walls are multi-layered. In one embodiment, the outer walls include an outer rubber-canvas layer 222, a braided metal mesh layer 224, a second rubber-canvas layer 226, and the outer wall 228 of a rubber air bladder. The inner wall includes the inner wall 230 of the rubber air bladder and a ribbed gripping lines 232, preferably formed of a rubber-canvas mentioned. Preferably, the sheath 212 contains a fastenable opening, such as a zippered opening 218 to make it easier to position the uninflated sheath 212 around the end of a bundle 16. After positioning the uninflated sheath around the bundle 16, the sheath 212 is inflated such as by connecting the valve 214 to a source of pressurized air. The pressurized sheath 212 exerts a pressure inward onto the bundle 16 so that the inflated sheath 212 is frictionally and releasably attached to the end of the bundle 16. Following inflation of the sheath 212, the rope 104 can be attached to pulling eyes 234 connected to the sheath 212, and used to pull the bundle 16.

The pulling reel 86 is then rotated by the motor 88 (FIG. 4), causing the rope 104 to be wound onto the reel 86 and, in turn, causing the bundle 16 to be drawn along the pathway to the conduit 82. During the pulling process, the pressure or force meter 102 provides an indication of the amount of force applied to the bundle 16. After the pull is completed, the rope 104 is rolled onto the pulling reel 86, and the tugger 84 is in condition to be moved to a position for the next pull, e.g., by front-loader 94.

According to another embodiment of the invention, the bundle 16, as it is formed, is not positioned onto a holding reel 14, but rather is drawn directly into the pathway 82. In this embodiment, wires are withdrawn from the reels 36, as described above, but, after being sent through a counter 54, are attached to the rope 104, rather than being wound onto the holding reel 44, so that the bundle is being formed as it is being drawn along the desired path.

Figure 10:
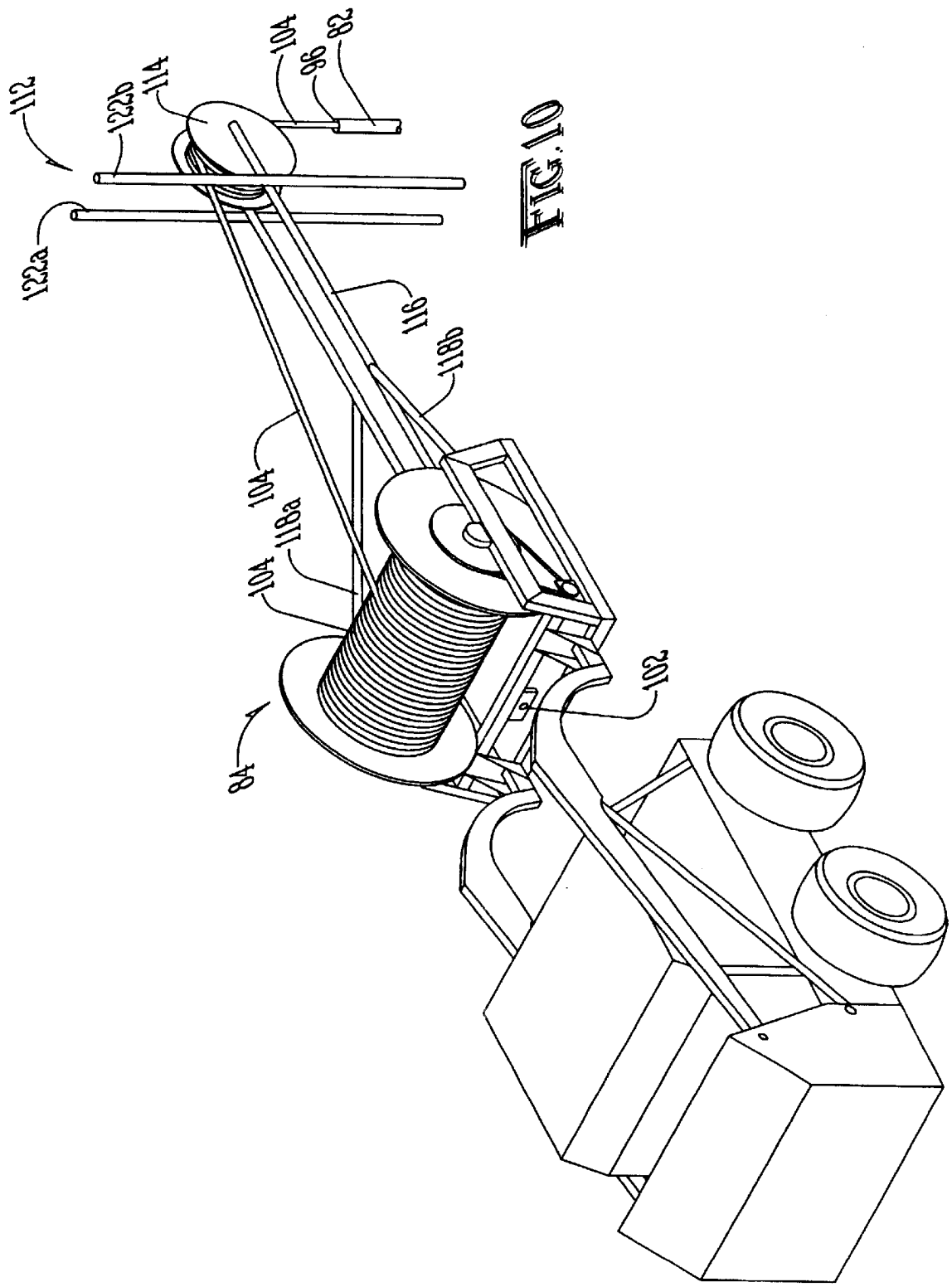
FIG. 10 is a perspective view of a pulling reel with a pulling attachment.

According to another embodiment of the invention, the tugger 84 is provided with an attachment 112 (FIG. 10). The attachment 112 includes a guiding device, such as a pulley 114 and a device for positioning the pulley 114, with respect to the tugger 84. Other devices which might be used to guide include low friction sliding guides, roller bearings, and the like. In the embodiment depicted in FIG. 10, the device for positioning the pulley includes a series of arms. The first arm 116 extends outward from the tugger 84 and is held in place partially by bracing arms 118*a*, 118*b*. If desired, the arms 116 may be extendable to provide adjustable length, such as by providing telescoping sections preferably which may be locked in a desired length, e.g. by pins or bolts passing through aligned holes. If desired, the arms 116 may be extendable or adjustable in an automatic fashion, e.g. using a hydraulic extension system. Upright arms 122*a*, 122*b* extend downward from the first arm 116 to rest against a surface such as a ground surface or a floor surface. The upright legs are preferably adjustable so that the guiding device 114 can be positioned a desired height above the surface or floor. Preferably the height can be adjusted by extending telescoping sections manually, pneumatically hydraulically or with hydraulic or other assistance, and, preferably, can be locked in place e.g. by a pin and hole system. Because the guiding device 114 is substantially smaller than the tugger 84, the guiding device 114 can be positioned in small spaces adjacent the conduit 82 to permit efficient pulling or tugging of wire or cable, even though the tugger 84 may be too large to be positioned immediately adjacent the end 96 of the pathway 82.

Figure 5:
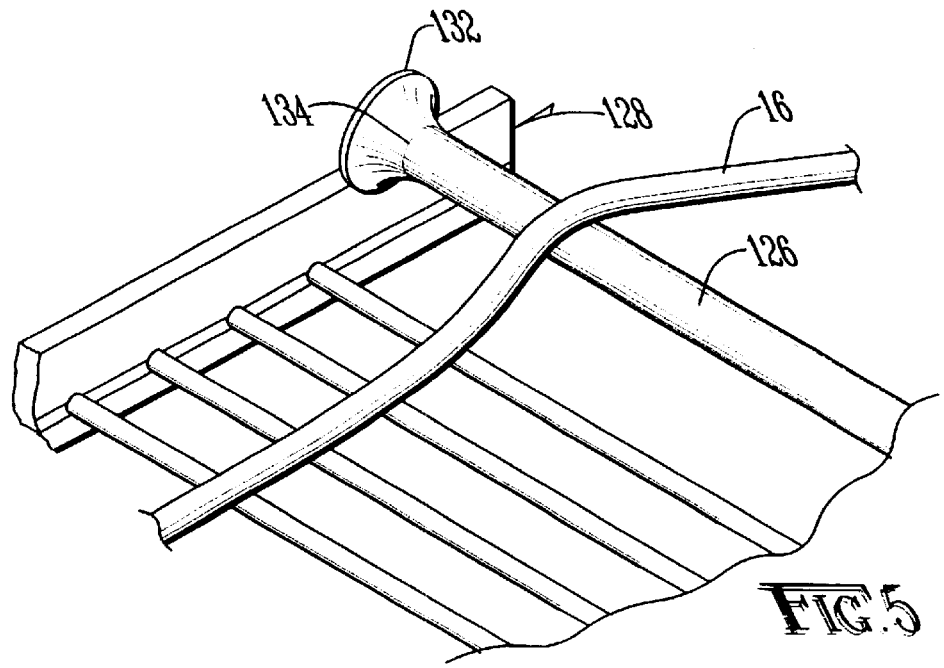
FIG. 5 is a partial schematic perspective view of a guide roller according to one embodiment of the present invention.

FIG. 5 depicts a roller 126 for guiding the bundle 16 and/or the rope 104 along a pathway, such as a wire trough 128. The roller 126 has a flared end flange 132. The external junction 134 of the roller shaft 136 and the flange 132 forms a smooth continuous surface without a shoulder or edge.

Figure 8:
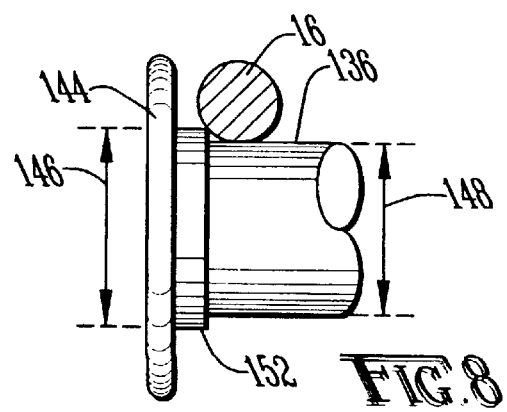
FIG. 8 is a elevational schematic view of a roller and portion of a cable with an endcap having a shoulder.

FIGS. 7 and 8 depict other types of end portions of rollers, and the difficulties which would be found in these other types of end portions. In FIG. 7, the end portion 142 is not flared so that the surface of the shaft 136 is perpendicular to the interior surface of the flange 142. This can cause the bundle or wire 16 to be forced into the corner formed between the flange 142 and the shaft 136 and to bind therein, defeating the purpose of the roller 126, which is to facilitate movement of the bundle 16 along the pathway. In the device shown in FIG. 8, the end flange 144 has a diameter 146 where it meets the shaft 136, which is larger than the diameter 148 of the shaft 136. This creates a shoulder 152 which can bind or damage the cable or bundle 16.

Figure 6:
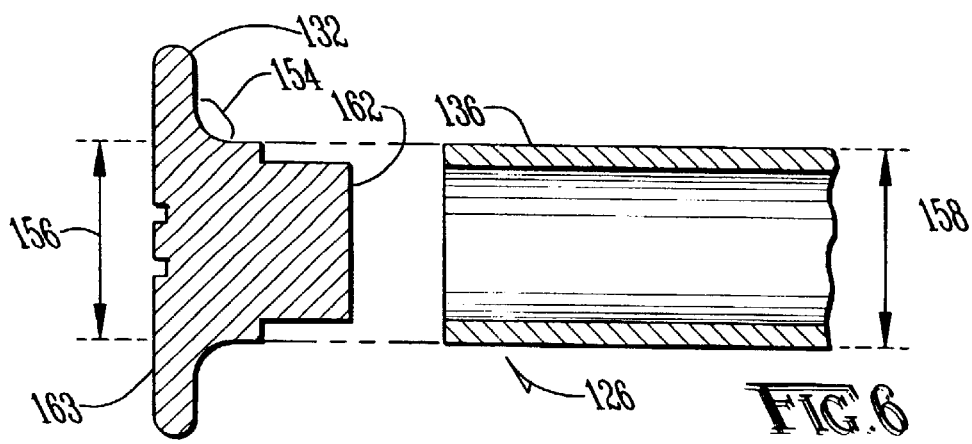
FIG. 6 is a cross-sectional, partly exploded view of a portion of a roller with an end flange according to the present invention.

According to one preferred embodiment, as shown in FIG. 6, the roller 126 is formed from a flange 132 which has a flared portion 154 and has a diameter 156 where it meets the shaft 136, which is equal to the diameter 158 of the shaft 156. The flange 132 is preferably formed from polyvinyl chloride (PVC) or similar material and has a plug portion 162 with a diameter to permit it to be press-fit into a hollow shaft 136. Preferably, the shaft 136 is formed from PVC pipe. The exterior face 163 of the flange 132 is preferably substantially planar or flat. In this way, two flanges 132 can be placed face-to-face to produce a roller 126 having one or more flared dividers 163', as depicted in FIG. 13.

According to another embodiment of the present invention, the rollers 126 can be positioned adjacent and substantially perpendicular, such as vertical rollers 164

Figure 9:
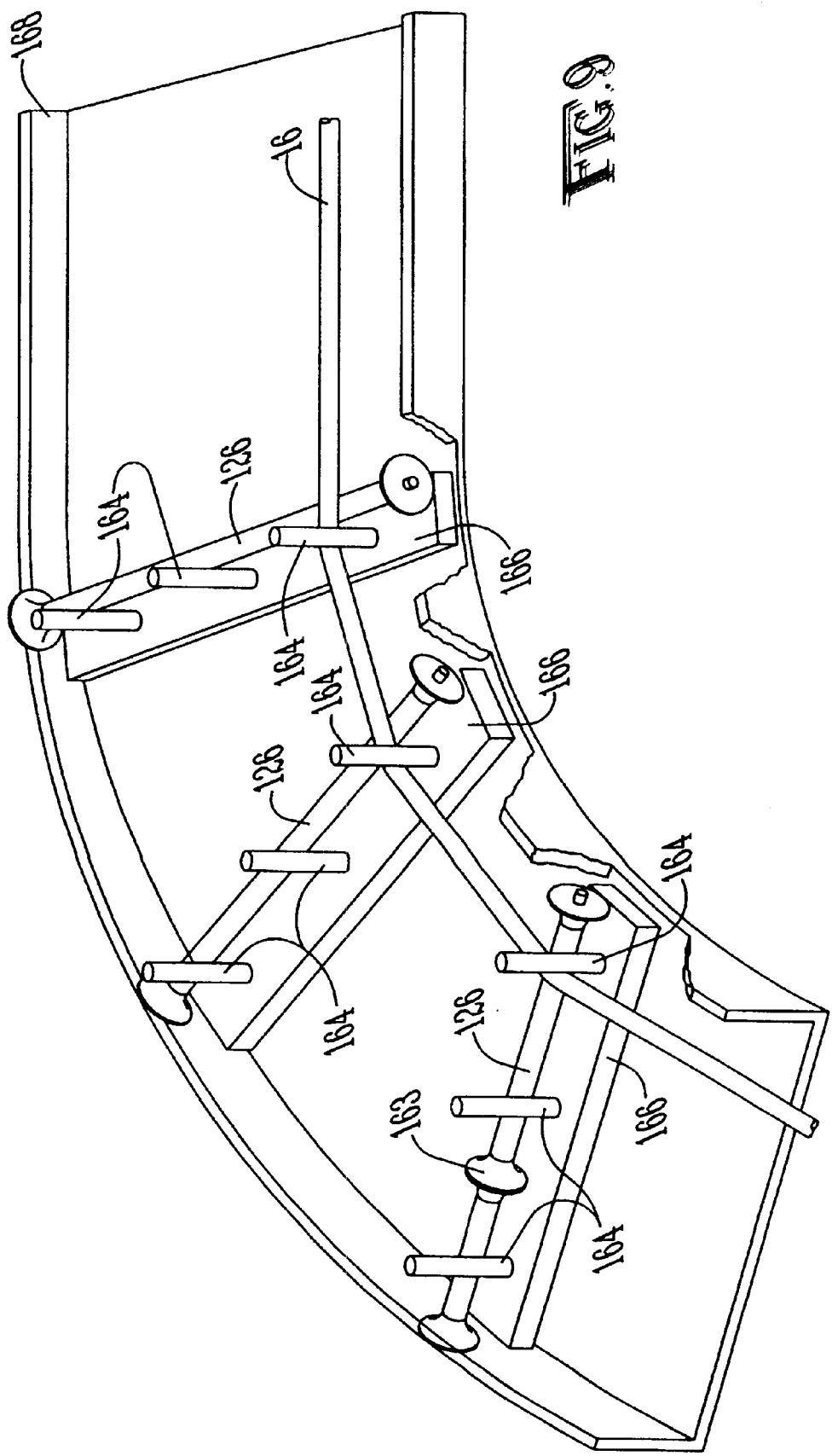
FIG. 9 is a schematic perspective view of rollers with vertical guide rollers according to one embodiment of the present invention.

(FIG. 9). In the configuration depicted in FIG. 9, both the main rollers 126 and the perpendicular rollers 164 are rotatably attached to holders 166. The main roller/vertical roller device is useful in guiding the cable 16 along a curved path, such as through a curved wire trough 168.

FIG. 12 depicts one fashion of fastening a roller to an I-beam portion of a cable tray according to previous methods. In the depicted device, a U-bolt 1202 is used to clamp a roller axle such as 1204 to the I-beam using a beam clamp such as that known as a Korn clamp 1206. One problem of using a beam clamp such as a Korn clamp is that it is relatively slow to release the clamp so that the axle 1204 can be released. For example, it may take about two minutes or more to loosen the nuts 1208a, 1208b, which hold the clamp 1206. This can be disadvantageous particularly because it is often desirable to release the axle 1204 from the cable tray in order to reposition cable or conduit from a position above the roller 1210 to a position underneath the roller. Depending on the cable pulling operation being performed, it may be necessary to release the axle 1204 multiple times and/or in multiple locations and thus the amount of time required to release the axle 1204 can, cumulatively, become significant on a given job.

Figure 15:
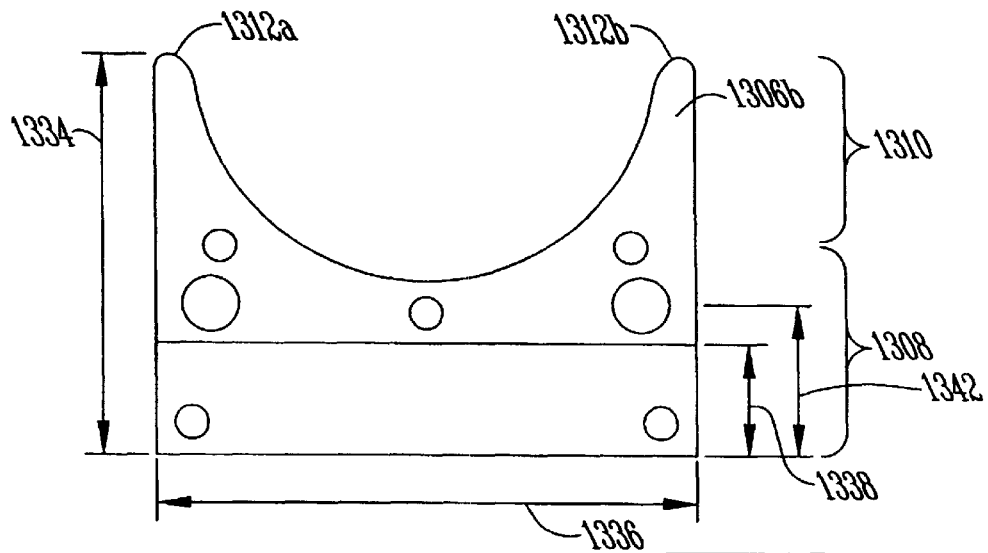
FIG. 15. is a front elevational view depicting a clip for connecting a roller to a cable tray according to an embodiment of the present invention.

FIGS. 13–15 depict a clip device for retaining a roller 1302 on a cable tray 1304. The clip 1306a, 1306b has a base portion 1308 and an upper portion 1310 with two upstanding ears 1312a, 1312b defining a cradle region 1314 with a U-shaped cross-section for receiving the circular-cross-section axle 1204. The lower portion 1308 includes a holding region such as angled region 1316 and a support surface 1318. A holding region can also be curved, cam-shaped or stepped and can be rigid, resilient or moveable (such as a spring-urged latch). The clips 1306a, 1306b are held to members of the cable tray 1304 by capturing between the holding or angled region 1316 and anchors such as J-bolts 1322a, 1322b. Anchors can be angled, rather than hooked, or moveable, such as a spring-urged latch. Passageway 1324a, 1324b may be provided through the clip 1306a, 1306b for accommodating the anchors 1322a, 1322b and the anchors 1322a, 1322b may be held in place by, e.g., nuts 1326a, 1326b engaging the threaded ends of the anchors 1322a, 1322b. Anchors can also be held in place by ratchet or latch devices, welds, rivets or adhesives. The clips 1306a, 1306b can be provided in a wide variety of sizes to accommodate different ranges of axle sizes. In the depicted embodiment, the clip has a depth 1332 of about 1.5 inches, a height 1334 of about 1.7 inches, a width 1336 of about 2.3 inches, a lower portion height 1338 of about 0.5 inches a passageway height 1342 of about 0.7 inches, a support surface depth 1344 of about 1 inch and a holding portion angle 1346 of about 15°. This device can be used to accommodate a number of sizes of axles, including 2 inches diameter rigid conduit and ¾ inch solid steel shaft. The device can be used with a variety of widths of cable tray by adjusting the width of the roller such as by using different lengths of PVC middle spacer material 1352 to adjust the length 1354 of the roller 1302.

Figure 16:
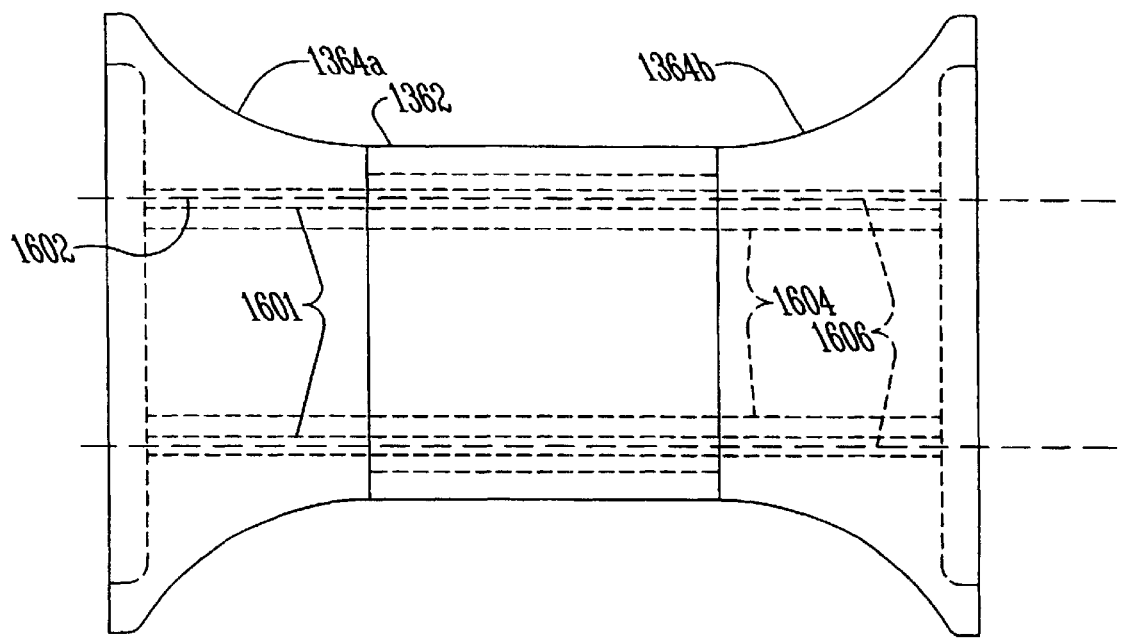
FIG. 16 is a front elevational view of a roller according to an embodiment of the present invention.
Figure 21A:
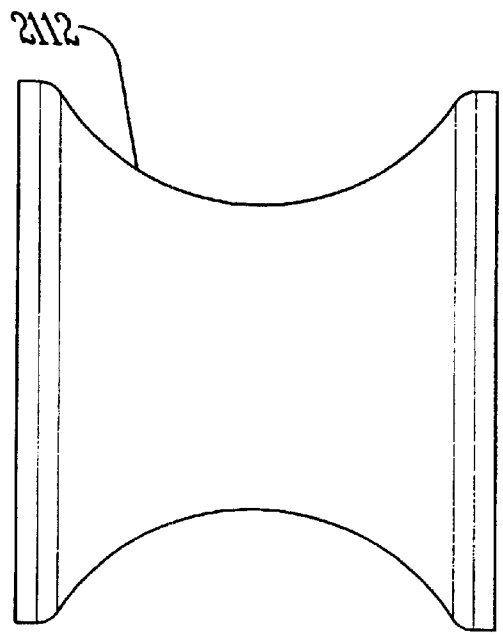
FIGS. 21A and B are side elevational views of continuously curved rollers according to embodiments of the present invention.
Figure 21B:
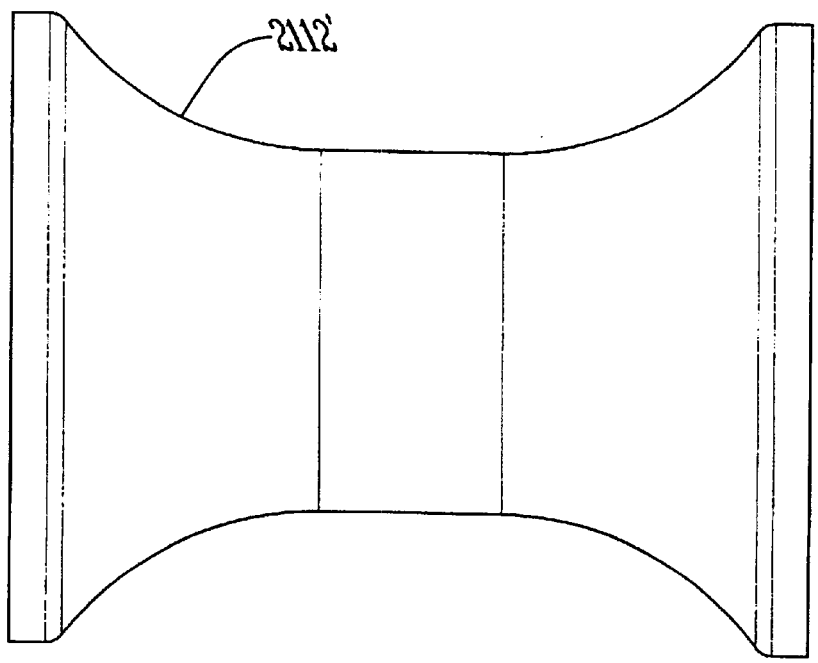
Figure 22A:
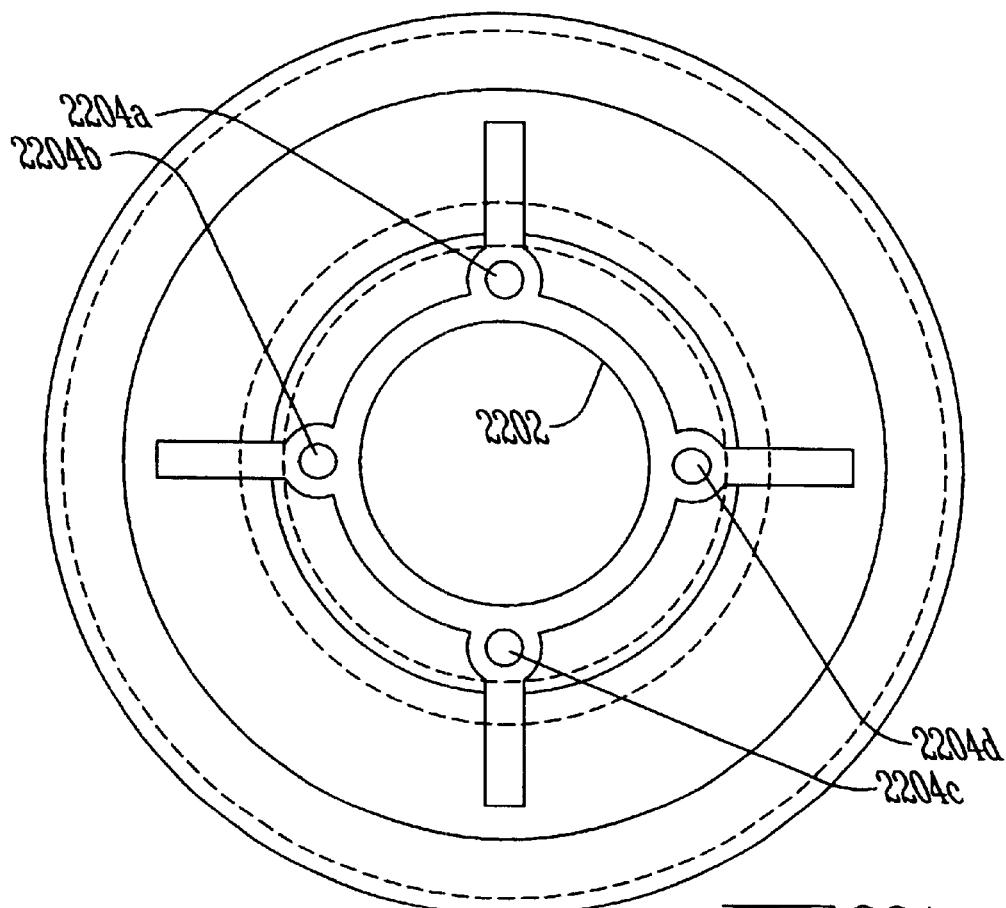
FIGS. 22A and B are end views of a rollers according to embodiments of the present invention.

FIG. 16 depicts one embodiment of a roller in which a central circular-cross-section cavity 1602, e.g., having a diameter of about 2½ inches, holds bushings or roller (or other) bearings 1604, such as brass or nylon sleeves or Teflon-impregnated nylon or Teflon-silicon sleeves to provide for ease of rolling of the roller with respect to the axle, and/or shims or spacers 1606 to accommodate, e.g., a 2 inch axle. Other sizes of inserts, bearings and/or sleeves can be used for accommodating other sizes of axles. Bearings, sleeves, bushings, shims, spacers and the like may, if desired, be embedded or molded into the body of the flange or roller. In one embodiment, the roller may move axially along the length of the shaft or axle 1204 and bearings and/or lubrication of the shaft or axle may assist in such lateral motion. Lateral motion can be useful in accommodating kinks or shape memory of a cable as it is pulled along, e.g., a cable tray where the kinks or shape memory tend to cause the cable to exert a lateral force on the roller. In configurations where the roller cannot accommodate lateral motion, a cable having a shape memory or kinks must be forced to assume a substantially linear shape despite the cable's shape memory, typically by applying a larger pulling or tensile force than would otherwise be necessary. In this way, the provision for lateral movement of the roller tends to reduce spikes in pulling tension and/or average pulling tension. Using holes 1362a, 1362b, 1362c in the end flanges of the rollers 1364a, 1364b, rollers can be bolted face-to-face, e.g., to make 6 inches sheave structures. In order to make the rollers stronger on pulling and tensile strength, four ¼ inch bolts can be inserted into four evenly-spaced holes 1364a, 1364b, 1364c on each roller. Use of bolts in this fashion is believed to provide up to a threefold or greater increase in roller strength. Multiple rollers can be used on each shaft or axle 1204 to pull multiple cables at one time. Rollers, flanges or sheaves can be formed of polyvinyl chloride (PVC) and, if desired, may have lubricant material embedded or included, e.g., for a self-lubricated bearing surface. Rollers may be made wider to allow wider rollers for multiple pulls on that roller. The rollers can vary in outside diameter to accommodate larger pulling requirements, or inside diameter to accommodate different shaft or axle sizes. Flanges can be coupled together in an end-to-end (rather than face-to-face) fashion, e.g. so that there is no cylindrical portion between the flared flange portions. If desired, the rollers, sheaves or the like may be formed as a single piece rather than as separate end pieces coupled together or to cylindrical roller portions. FIGS. 21A and 21B depict, in side view, rollers provided without an intermediate cylindrical portion such that substantially all of the cable contact surface 2112, 2112' is curved. As shown in the end view of FIGS. 22A, the central axle opening 2202 may be adjacent bolt holes 2204a,b,c,d, e.g. as for use as discussed above. One-piece or multiple-piece rollers according to the present invention can be provided in a wide variety of sizes such as small as 1 inch or less in width and as large as 48 inches or more in width.

One advantage of the depicted clip is the ease with which the shaft 1204 can be disengaged from one (or both) clips 1306a, 1306b, e.g., for moving the cable from a position on top of the roller to a position below the roller on the cable tray. This procedure can be accomplished in about 10 seconds for snapping the roller out and back. In one embodiment, the ears incline slightly inward above the centerline of the axle to hold the axle in place, but are resilient, to permit disengaging the axle from the clip by lifting up. Other devices for retaining the axle can be used such as spring-urged latches, gates, bushings and the like.

In one embodiment, the clips 1306a, 1306b are made from a plastic material such as polyvinyl chloride. It is also possible to make the clip from other materials including metals such as zinc-plated steel, e.g., for hazardous locations. Although the depicted embodiment shows attachment of the clips to an I-beam cable tray, the clips can also be attached to other types of trays such as C-channel cable trays.

FIG. 23 depicts a plurality of rollers or sheaves coupled to a radiused holder such as may be used for guiding cables along non-linear portions of paths, such as around a corner or upward to a higher level. The conveyor sheave device of FIG. 23 can be provided in a number of sizes such as defining a radius of curvature of any of a plurality of sizes such as 48-inch, 60-inch, 72-inch, 84-inch radii (or larger, smaller or intermediate radii). In one embodiment, the holder is adjustable so as to accommodate a number of different radii. The size of the sheaves or rollers in the conveyor sheave device can be selected from among a plurality of sizes such as providing 6-inch rollers, 8-inch rollers, 12-inch rollers, or larger or smaller (or intermediately sized rollers). In one embodiment, the conveyor sheave device of FIG. 23 is configured for use in connection with the roller devices of FIG. 21 and in particular is configured to permit coupling above or on top of a cable tray.

Figure 22B:
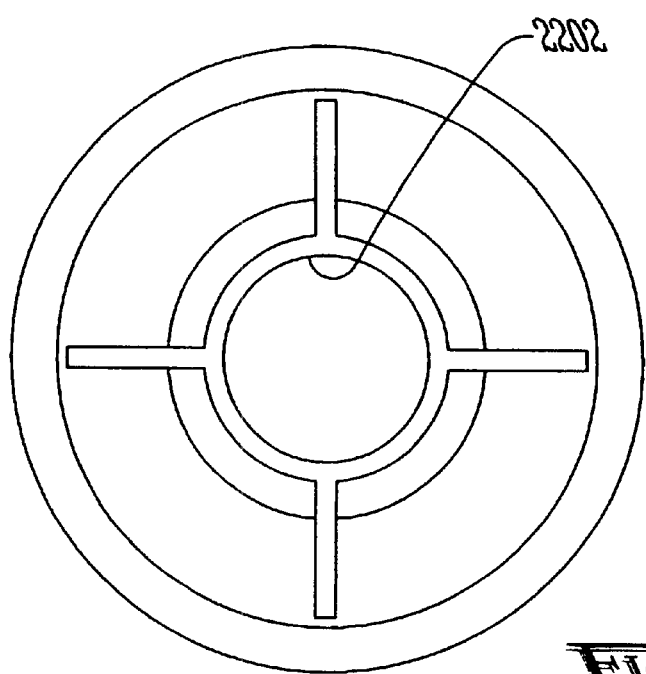

As seen in FIG. 23, the radius sheaved device 2312 is configured to facilitate coupling to a cable tray, scaffolding and the like. In the depicted embodiment, a plurality of holes such as ½ inch bolt holes are provided in at least one 2314a, 2314b and preferably both 2316a, 2316b of the upper and lower plates 2318a,b and may be used for attaching a variety of coupling items including, e.g., a ¼ inch welding plate 2322, hooks such as change hooks 2324a, 2324b and/or scaffolding clamp and pivot knuckles 2426. Preferably the holes 2314a, 2314b, 2316a, 2316b are positioned between the rotatable sheaves 2328a, 2328b so that bolts or other attachment devices 2332a–2332d may be inserted without interfering with rotation of the sheaves 2328a, 2328b or movement of the cable 2334. In some configurations it is desirable to pass the bolt through both plates 2318a, 2318b as shown in FIG. 23 for the hook bolts 2332b, 2332c. For this reason, preferably the respective bolt holes on the first and second plates 2318a, 2318b are substantially aligned. It is believed that a device such as a radiused sheave which is not configured to accommodate attachments in the manner depicted, (e.g. which does not provide bolt holes) is used by attaching or detaching brackets or latches such as by welding to a radiused sheaved device and/or a cable tray. The configuration of FIG. 23 is believed to reduce the amount of time, effort and expense involved in coupling the radiused sheave to, e.g., a cable tray scaffolding and the like. The conveyor sheave device as depicted in FIG. 23 is believed to substantially assist in reducing average and maximum pulling tension and can be configured to attach to external supports other than the cable tray. In one embodiment, the rollers of the embodiment of FIG. 22 are made of fiber-impregnated nylon preferably with brass bushings and/or bearings molded in the rollers.

Figure 24:
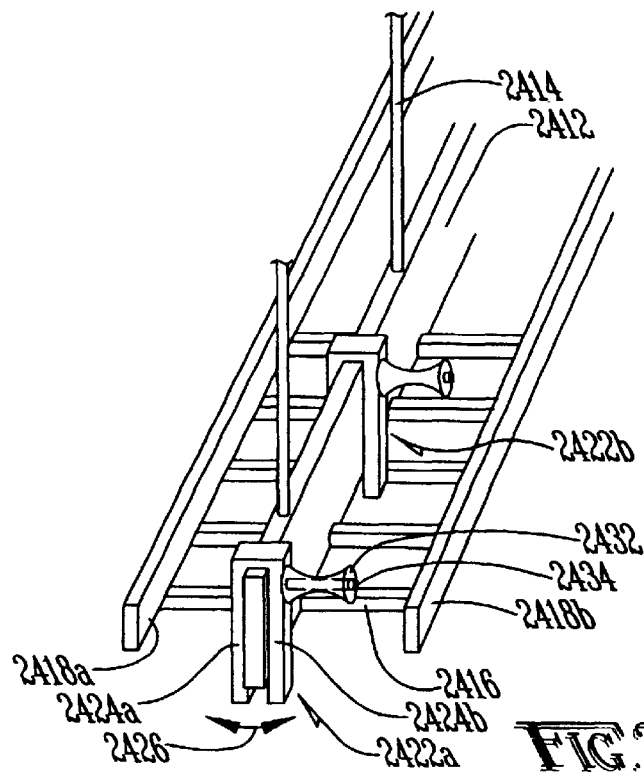
FIG. 24 depicts a center beam tray and roller holders usable therewith in accordance with an embodiment of the present invention.

FIG. 24 depicts a system for mounting rollers to, and preferably above, a center beam ("monorail") cable tray. In a center beam cable tray, a single beam 2412 is suspended e.g. by a plurality of cables 2414 or otherwise positioned with a cable tray, such as a cable tray comprising a plurality of cross ties 2416 and/or substantially vertical side rails 2418a,b extending therefrom. In the depicted embodiment, a substantially inverted-U shaped roller holder 2422a, 2422b is provided with first and second downwardly extending arms 2424a,b having sufficient resiliency (or otherwise moveable with respect to one another) that they may be temporarily splayed apart 2426 to permit the roller holder 2422a to be positioned over the center beam 2412 as depicted in FIG. 24 or removed therefrom. The roller holders 2422a,b may be formed of a number of materials including PVC or other plastic or resilient materials. Preferably the roller holders are made of a high-impact resistant and non-corrosive material such as PVC. In the depicted embodiment, a roller 2432 extends from the roller holder 2422a substantially laterally and horizontally outward and is preferably rotatably coupled thereto, e.g. by being rotatably mounted on an axle 2434 extending from the holder 2422. By positioning a plurality of roller holders 2422a,b with attached rollers on the center beam 2412, a cable may be pulled along a path defined by the plurality of rollers, preferably positioned above the cable tray. Although in the depicted embodiment the opening defined between the legs 2424a, 2424b of the holder is substantially the same size and shape as the center beam 2412, it is possible to use the holder in connection with a beam 2412 that is substantially smaller than the opening, such as a beam which is shorter than the opening, since the weight of the cable will tend to position the holder adjacent the top of the center beam 2412. In this way, a single size of roller holder may be used for a plurality of sizes of center beams. The depicted roller holder has a single roller extending from one side of the holder and, if desired, it is possible to position some or all of the roller holders rotated 180° to position rollers on the opposite side (left side in the view of FIG. 24) of the center beam 2412. It is also possible to configure roller holders to hold more than one roller such as providing rollers on both sides of the center beams, multiple vertical levels of rollers or two or more horizontally aligned rollers per roller holder.

Regardless of the shape of the cable tray or other pathway-defining structure, in many installations it is desirable to move, position or hold a cable within a cable tray e.g. to permit sufficient space to accommodate multiple cables in a cable tray. FIG. 29 depicts a system using a jack for positioning and/or holding a cable in a cable tray (in the illustrated embodiment, a curved or arched cable tray). Although a number of types of jacks can be used, in the depicted embodiment, the jack 2512 is similar to a jack of a type often provided for use with automobiles (a "bumper" jack), but modified and used as described below. In the depicted embodiment the jack 2512 includes a staff portion 2514 with a plurality of teeth 2516 and a moveable section 2518 which is positionable lengthwise 2520 along the staff 2514, e.g. by a ratchet mechanism operated via a hand lever 2522. Typically, a directional lever 2524 determines whether the moveable portion may be moved toward or away from a staff end 2526. In the depicted embodiment, a first staff end 2526 is provided with one or more plates 2528a, 2528b defining a surface or surfaces for contacting a portion of the cable 2532 for moving or holding the cable as described below. In one embodiment the plates 2528a,b may be provided by welding or otherwise coupling L-irons on either side of the staff end 2526. One or more plates are coupled to the moveable portion 2518 such as by welding one or more L-irons 2534 to the moveable portion preferably with a base substantially parallel to and opposed to the surfaces defined by the staff end plates 2528a, 2528b.

Figure 25:
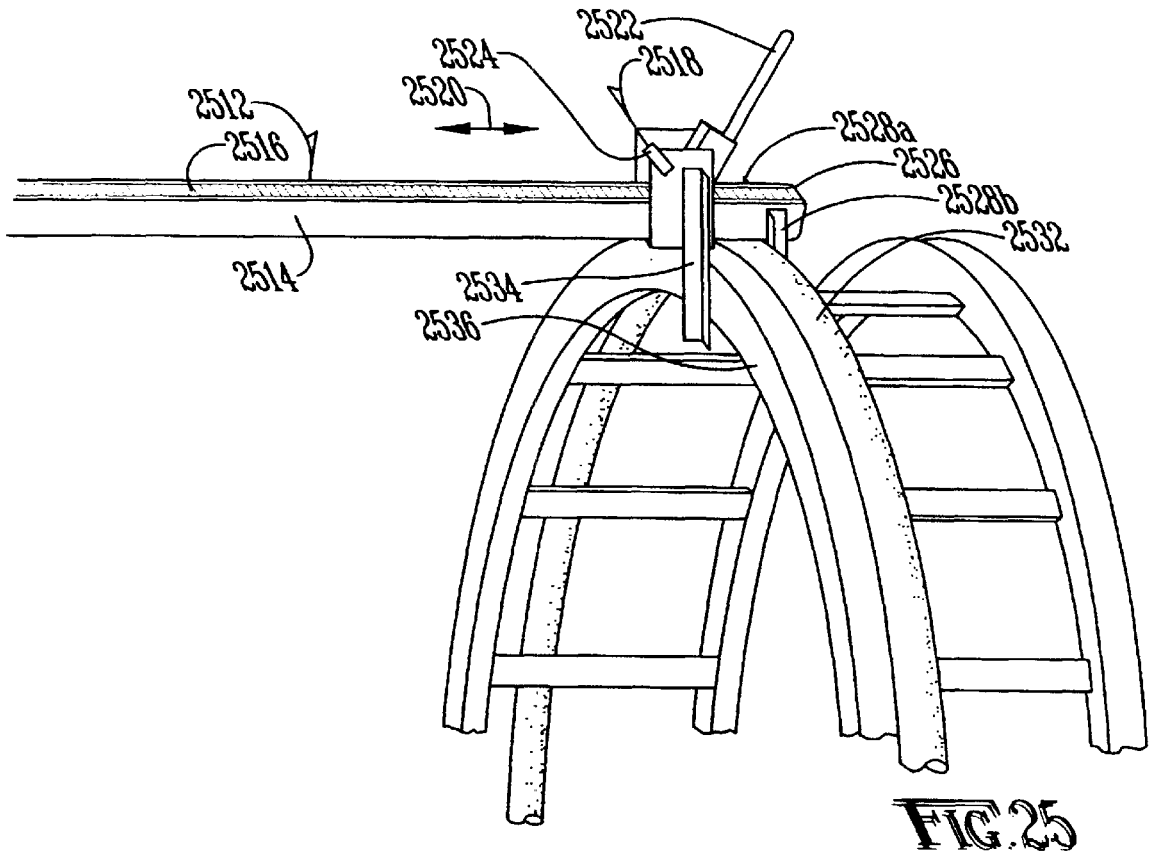
FIG. 25 is a perspective view of an arched cable tray and a cable jack according to an embodiment of the present invention.

In use, the jack 2512 is positioned with one set of plates such as the staff end plates 2528a, 2528b, in the vicinity of a portion of the cable 2532 and the moveable portion plate 2534 adjacent a fixed structure such as a portion of a cable tray 2536. The lever 2424 is set so that operation of the handle 2522 results in bringing the moveable portion 2518 toward the first staff end 2526 and thus drawing the staff end plates 2528a, 2528b toward the moveable portion plate 2534 and accordingly, drawing the cable 2532 towards the cable tray edge or other fixed object 2536. In this way, cables, including those which are relatively heavy or stiff, can be positioned at a desired location in a cable tray or other pathway-defining structure. Although only a single jack is depicted in FIG. 25, it is anticipated that, in use, a plurality of such jacks will be used along the length of the cable. In addition to using a jack for positioning a cable, jacks may be used to clamp or hold a cable in a desired position. After the desired function is served, the jack may be removed, e.g. by moving the lever 2424 to a release or reverse position.

In light of the above description, a number of advantages of the present invention are apparent. Positioning rollers above a cable tray or other path facilitates placement of multiple cables and reduces friction during cable placement. Such positioning is especially useful when rollers are configured to be quickly and easily positioned and/or moved (e.g. lifting rollers to lower positioned cables into the tray. Positioning of the rollers above the tray also utilizes the load-bearing strength of the tray sidewalls. Positioning rollers above the cable trays is particularly advantageous when cable is being installed in a tray already containing other cabling (to avoid frictional contact therewith). By mounting the tugger on a front loader or similar equipment as described, the tugger can be used without coupling it to a massive or immobile structure such as a building beam or other portion. It is thus possible to achieve high efficiency by positioning the tugger close to a pulling point such as the end of a conduit, end of a cable tray or the like. Preferably, the tugger is sized and configured to be coupled to a relatively small front loader (such as those sold under the trade name "Bobcat". In this way, the tugger can be positioned near a pulling point even when the pulling point is located in a relatively narrow passageway. Because the tugger is preferably coupled to a vehicle rather than to a fixed structure, it can be relatively easily and quickly moved to align and realign desired pulling angles. It can also be moved as desired from spot to spot to pull cable or pull slack in cable. As desired or needed, the front loader or other equipment and/or the tugger stand may be anchored to fixed objects such as building portions, although it is believed such anchoring is not required in all cases to achieve desired pulling.

A reel rack, e.g. as depicted in FIGS. 17 and 18, is able to accommodate a wide range of reel sizes and is configurable to accommodate a plurality of reels or a single large reel. Preferably the device is configurable with or without casters or other wheels e.g. in a wegn or trailer fashion. The rack may be moved in a number of fashions such as via (preferably adjustable) fork cavities and/or lift hooks. The rack preferably facilitates mounting or removal of reels such as by including plates or other guide devices for positioning a reel axial and/or preferably providing locking pins or other devices and roller supports to facilitate rotation while remaining in the desired position.

Movement and positioning of a tugger, preferably to apply a tugging force in the location where it is most effective, may be facilitated by devices for attaching to a front loader fork lift or similar conveyance means, e.g. as depicted generally in FIG. 19. Preferably a plate or other device is available for rapidly coupling the front loader or similar device, and rapidly uncoupling, with respect to a tugger.

Movement of cables e.g. along a desired path may be facilitated by an intermediate tugger such as the endless track device depicted in FIG. 20 providing cable movement force without the requirement for having access to a cable end and while avoiding damage to the cable from the movement facility.

Movement of cable along a non-linear path such as a round corner or to a higher or lower level is, in one embodiment, facilitated by a radiused sheave device e.g. as depicted in FIG. 23 preferably provided with one or more coupling devices to facilitate positioning or attachment with respect to, e.g., a cable tray, scaffolding and the like in a manner which is relatively easy to facilitate and to decouple.

In situations in which the cable tray includes a general beam member, rollers may be positioned preferably above the tray, using central beam coupling devices preferably with deflectable or moveable arms for embracing or grasping the central beam, e.g. as depicted in FIG. 24. Movement positioning or holding of a cable in a desired location, e.g. with respect to a cable tray or other desired path can preferably be achieved using one or more cable jacks. As depicted generally in FIG. 25, cable jacks can be used without damaging the cables by providing plates or other flat surfaces for contacting the cable.

In one embodiment, a first length of the first wire is pulled or dispensed from the rack using the counter to measure the length which is removed. Preferably, the removed wire or wires are held on a holding spool. The holding spool may be freely rotatable or driven.

After a first length of wire is removed, a second length of wire is placed adjacent the first wire and the two (or more) wires are thereafter removed or pulled from the rack together. In this way, since wires are removed simultaneously, it is not necessary to individually pull each length of wire. Furthermore, since the first predetermined length is calculated to correspond to a desired bundle configuration, it is not necessary to adjust the position of the individual wires in order to obtain the desired bundle configuration.

The process is continued by adding further wires to the bundle and/or cutting wires to fix their terminal position in the bundle. Eventually, the last wire in the bundle is cut and thus the bundle will have been formed in one pulling operation, i.e., without the need for separately pulling each wire of the bundle and/or without the need for positioning the wires relative to each other after they have been withdrawn from their rack and cut. Bundles can be formed in a shorter amount of time than was needed for previous methods since, among other reasons, wires are withdrawn from several reels simultaneously, and repositioning of the components of the bundles is unnecessary. Because two or more wires are being formed into the bundles simultaneously, accuracy of bundle formation is increased. To assist in guiding the bundle, rollers can be provided with fluted endcaps, continuous with the outside diameter of the cylindrical roller, to prevent binding or damage to the bundle. Preferably the fluted endcaps have flat outer faces which can be mounted back-to-back to provide a multi-channel roller. Rollers can also be provided in conjunction with one or more guide rollers preferably placed perpendicularly to the main rollers.

A number of variations and modifications of the invention can be used. Although rollers, sheaves and the like have been described in connection with installing cabling, the rollers and clips and other attachment devices described herein can be used for other purposes such as other cable reeling, wrapping, pulling and storage processes and devices, rope wrapping, and generally for moving materials and items such as assisting in positioning planking or other scaffolding components at desired scaffolding levels.

Although the present invention has been described by way of a preferred embodiment and certain variations and modifications, other variations and modifications can also be used, the invention being defined by the following claims.

What is claimed is:

1. A cable pulling system of pullers, vehicle and universal coupling apparatus facilitating ready coupling/uncoupling therebetween during job-site cable-pulling operations, said cable pulling system comprising:
- a plurality of cable puller apparatus, each comprising a stand, a driven pulling reel and reel line;
- at least one vehicle, having a front-end lifting structure, selected from a group consisting of front loaders or forklifts of various diverse styles; and
- universal coupling apparatus comprising a plurality of socket devices and at least one insertion device;
- wherein each of the plurality of socket devices is corresponded with another of the plurality of cable puller apparatus such that each socket device is adaptable on some occasion before job-site cable-pulling operations to be securely attached to the respective stand of the corresponding cable puller apparatus, and furthermore the plurality of socket devices are each uniformly provided with a universal receiver formation and a universal latch-retention formation;
- wherein the at least one insertion device is adaptable to be securely attached to the front-end lifting structure of the at least one vehicle, and furthermore the at least one insertion device having a receiver-mating formation and a user-operable latch device such that during job-site cable-pulling operations a user can navigate the vehicle and readily couple up with and then uncouple from any given cable puller apparatus of the plurality thereof by delivering the insertion device's receiver-mating formation to the given socket device's universal receiver formation and then complete mechanical securing therebetween by latching the latch device operatively with the latch-retention formation, and then repeat such in reverse to uncouple so that the vehicle is free be navigated elsewhere to couple a successive time during job-site cable-pulling operations with any of the other cable puller apparatus.

2. A cable pulling system as claimed in claim 1, wherein each latch-retention formation comprises at least a first hole formed in the respective socket device and each latch device comprises at least a first extendable bar, coupled to said insertion device and extendable through said first hole.

3. A cable pulling system as claimed in claim 1, wherein said receiver formation comprises a lip.

4. A cable pulling system as claimed in claim 1, wherein each cable puller apparatus further comprises winding means for distributing said line on said reel in a substantially even manner.

5. A cable pulling system as claimed in claim 1, wherein each cable puller apparatus further comprises a recording graph means for recording pulling tension.

6. A cable pulling system as claimed in claim 1, wherein each cable puller apparatus further comprises a multiple speed transmission means for adjusting pulling speed.

7. A cable pulling system as claimed in claim 6 wherein said multiple speed transmission means includes an electric motor.

8. A cable pulling system as claimed in claim 1, wherein each cable puller apparatus further comprises an elongated boom for positioning a line guide at a desired level with respect to said pulling apparatus.

9. A cable pulling system as claimed in claim 8, further comprising one or more legs extending between top ends and feet for resting on the ground of a base support surface, said legs being disposed at or near the line guide on the boom and providing various points of attachment up and down said legs for adjusting the effective height of said boom as well as propping up the line guide against downward pull from tension with the reeled-in line.

10. A method for cable pulling comprising the steps of:
- providing a plurality of cable puller apparatus, each comprising a stand, a driven pulling reel and reel line;
- providing at least one vehicle that has a front-end lifting structure and is selected from a group consisting of front loaders or forklifts of various diverse styles; and
- providing universal coupling apparatus comprising a plurality of socket devices and at least one insertion device;
- on some occasion before job-site cable-pulling operations, corresponding each of the plurality of socket devices with another of the plurality of cable puller apparatus and securely attaching each socket device to the respective stand of the corresponding cable puller apparatus;
- providing each of the plurality of socket devices uniformly with a universal receiver formation and a universal latch-retention formation;
- securely attaching the at least one insertion device to the front-end lifting structure of the at least one vehicle;
- providing the at least one insertion device with a receiver-mating formation and a user-operable latch device;
- during job-site cable-pulling operations, affording a user opportunity to navigate the vehicle and readily couple up with and then uncouple from any given cable puller apparatus of the plurality thereof by delivering the insertion device's receiver-mating formation to the given socket device's universal receiver formation and then complete mechanical securing therebetween by latching the latch device operatively with the latch-retention formation, and then repeat such in reverse to uncouple so that the vehicle is free be navigated elsewhere to couple a successive time during job-site cable-pulling operations with any of the other cable puller apparatus.

\* \* \* \* \*